(12) United States Patent
Park et al.

(10) Patent No.: US 11,856,292 B2
(45) Date of Patent: Dec. 26, 2023

(54) CAMERA MODULE OUTPUTTING DIFFERENT OPTICAL SIGNALS BASED ON DEPTH OF OBJECT

(71) Applicant: LG INNOTEK CO., LTD., Seoul (KR)

(72) Inventors: Gwui Youn Park, Seoul (KR); Yong Sun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/611,013

(22) PCT Filed: May 13, 2020

(86) PCT No.: PCT/KR2020/006266
§ 371 (c)(1),
(2) Date: Nov. 12, 2021

(87) PCT Pub. No.: WO2020/231165
PCT Pub. Date: Nov. 19, 2020

(65) Prior Publication Data
US 2022/0264021 A1    Aug. 18, 2022

(30) Foreign Application Priority Data
May 13, 2019  (KR) .................. 10-2019-0055720

(51) Int. Cl.
*H04N 23/67* (2023.01)
*H04N 23/66* (2023.01)

(52) U.S. Cl.
CPC .......... *H04N 23/671* (2023.01); *H04N 23/66* (2023.01)

(58) Field of Classification Search
CPC ......... H04N 5/232121; H04N 5/23203; H04N 5/232; H04N 13/239; H04N 13/254; H04N 5/2256; H04N 5/23218; H04N 5/23245; H04N 5/2354; H04N 5/36965; H04N 23/671; H04N 23/66; H04N 23/60
See application file for complete search history.

(56) References Cited

U.S. PATENT DOCUMENTS

| 10,957,059 B1* | 3/2021 | Katz .................... H04N 13/327 |
| 2012/0162370 A1* | 6/2012 | Kim .................... H04N 13/254 |
| | | 348/46 |

(Continued)

FOREIGN PATENT DOCUMENTS

| KR | 10-2016-0090464 A | 8/2016 |
| KR | 10-2016-0092137 A | 8/2016 |
| KR | 10-2018-0013564 A | 2/2018 |

*Primary Examiner* — Albert H Cutler
(74) *Attorney, Agent, or Firm* — Birch, Stewart, Kolasch & Birch, LLP

(57) ABSTRACT

Disclosed in the present invention is a camera module comprising: an optical output unit for outputting a first optical signal and a second optical signal to an object; a sensor for receiving a first reflected optical signal in which the first optical signal is reflected by the object; and a control unit for obtaining first distance information to the object by using the first optical signal and the first reflected optical signal, wherein an output of the first optical signal is smaller than an output of the second optical signal, and the control unit determines whether to output the second optical signal by using the first distance information.

18 Claims, 17 Drawing Sheets

(56) References Cited

U.S. PATENT DOCUMENTS

| | | | |
|---|---|---|---|
| 2017/0277950 A1* | 9/2017 | Sung | G06V 40/18 |
| 2018/0150709 A1 | 5/2018 | Ha | |
| 2019/0005671 A1* | 1/2019 | Zhang | H04N 13/239 |
| 2019/0051005 A1 | 2/2019 | Chang | |
| 2019/0079170 A1* | 3/2019 | Masuda | G01S 17/10 |
| 2019/0095681 A1 | 3/2019 | Lee et al. | |
| 2019/0171804 A1 | 6/2019 | Lee et al. | |
| 2019/0310375 A1* | 10/2019 | Finkelstein | G01S 7/4868 |

* cited by examiner

[Fig.1]
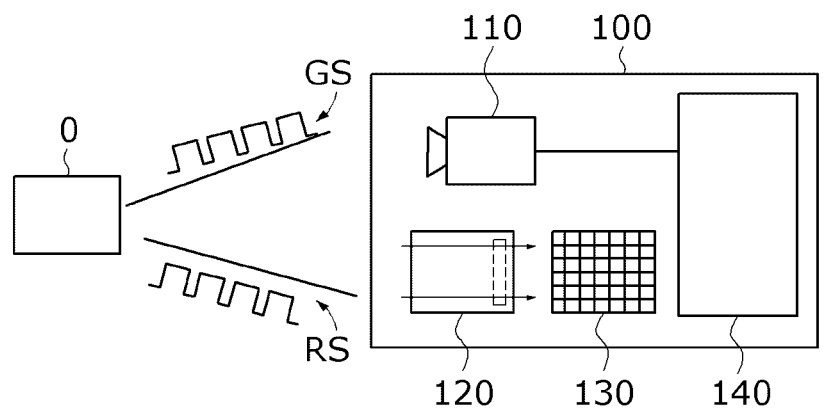
[Fig.2]
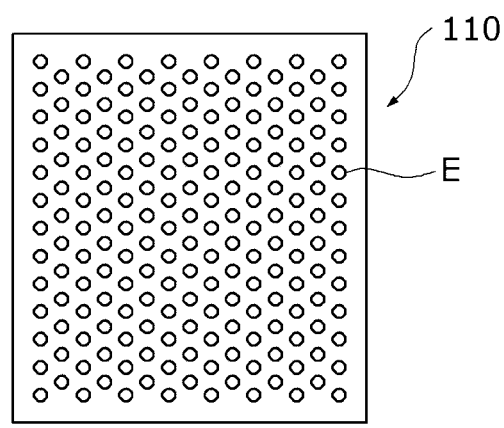

[Fig.3]
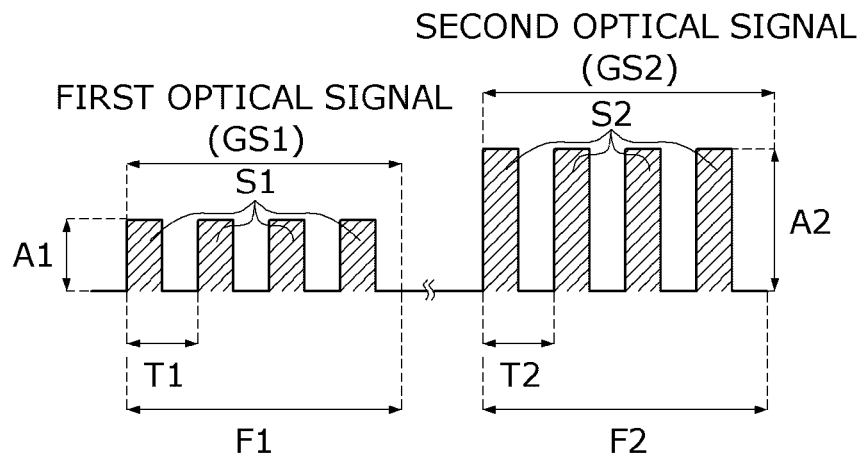
[Fig.4]
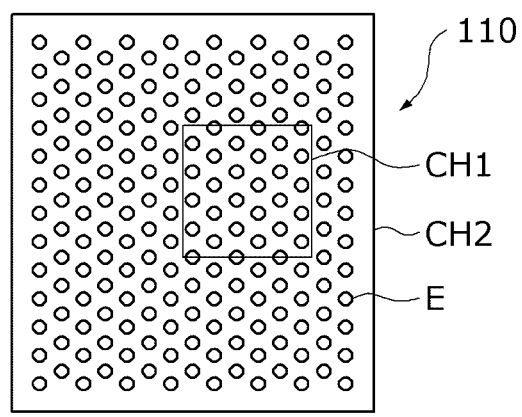

[Fig.5]
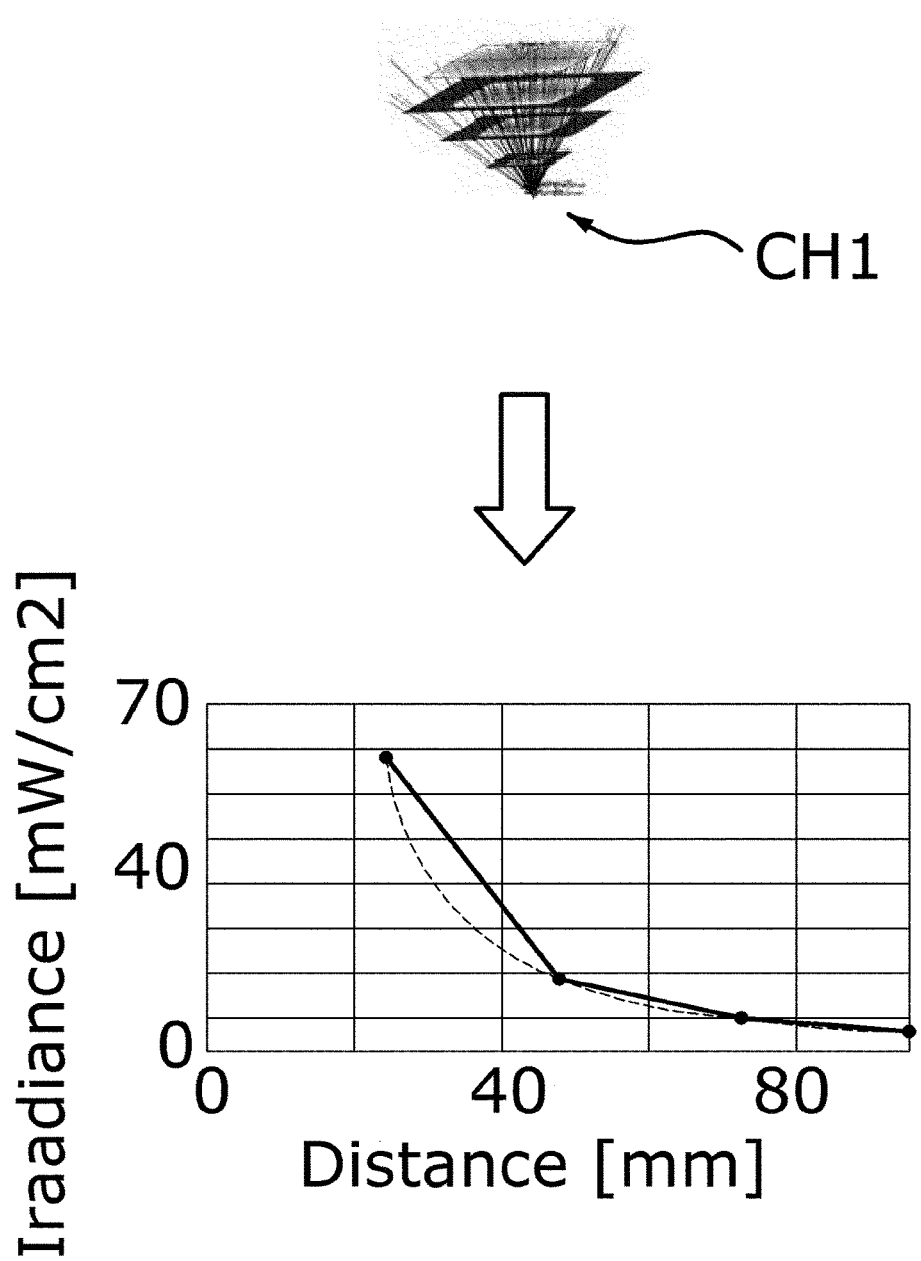

[Fig.6]
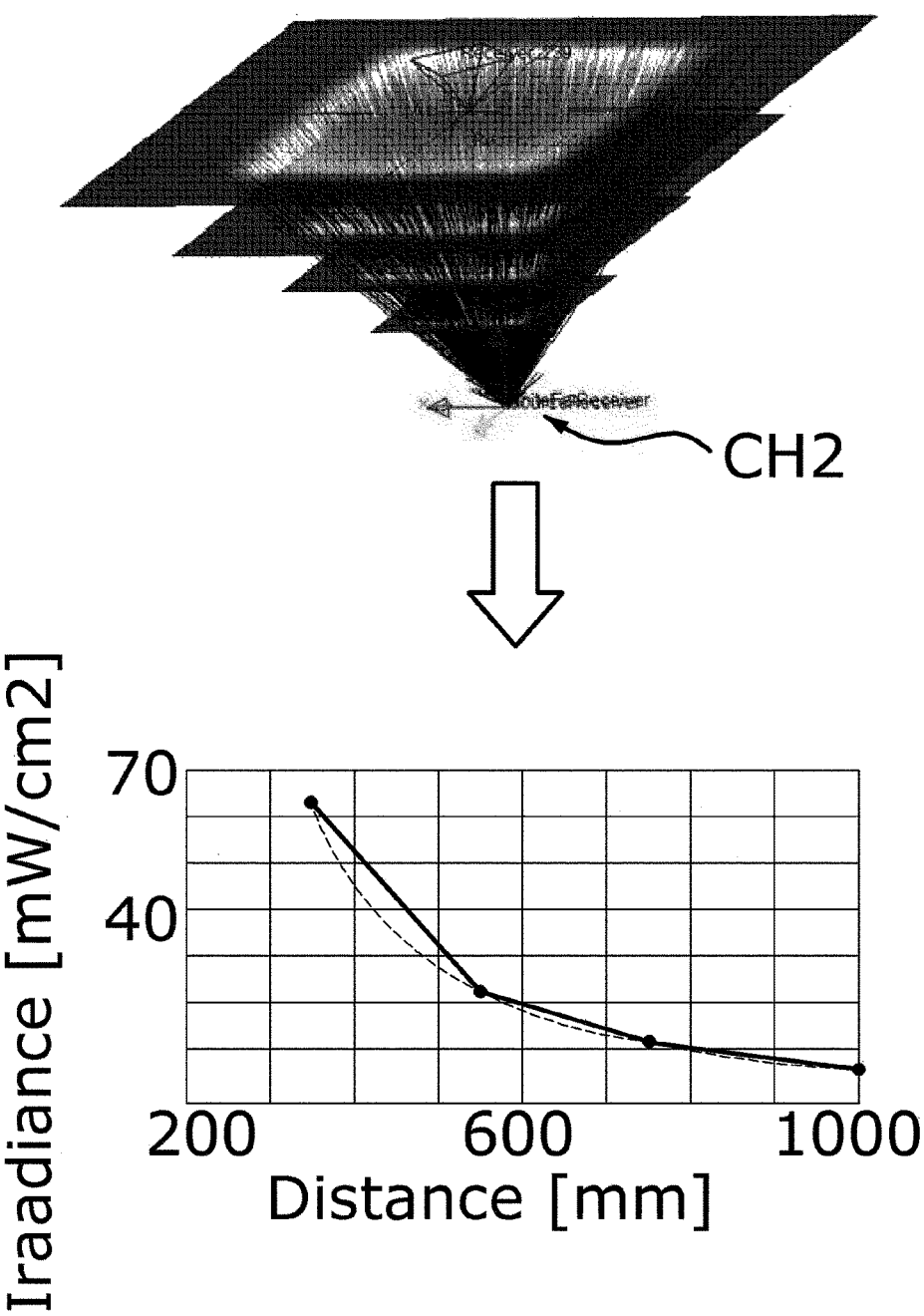

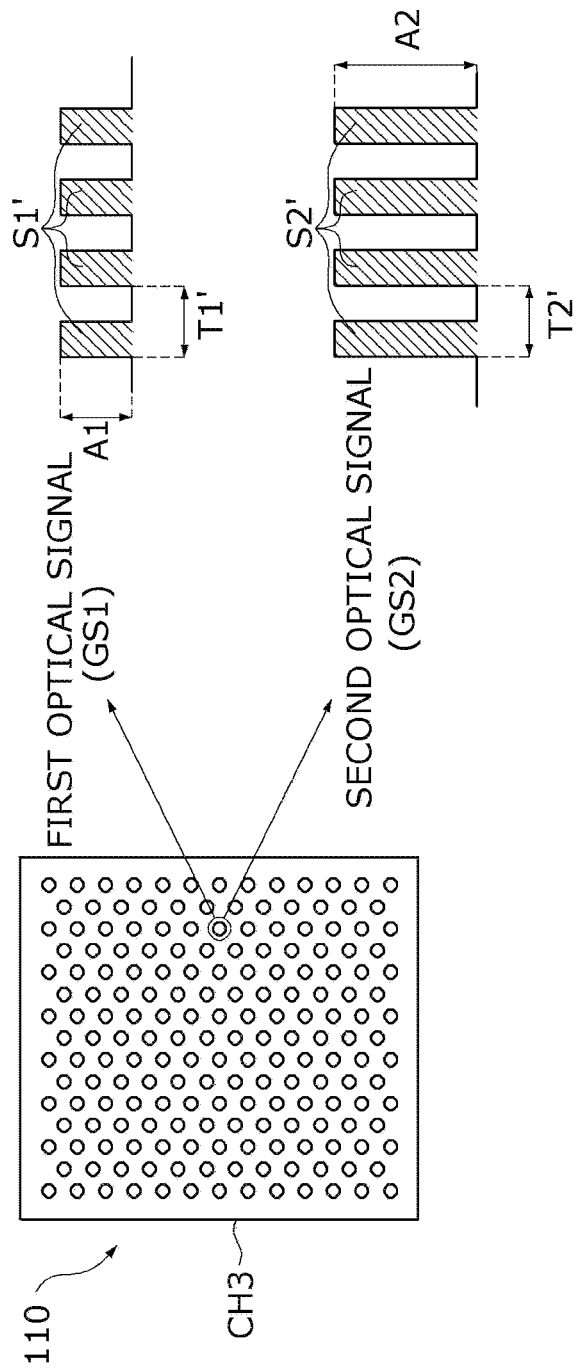

[Fig.8]
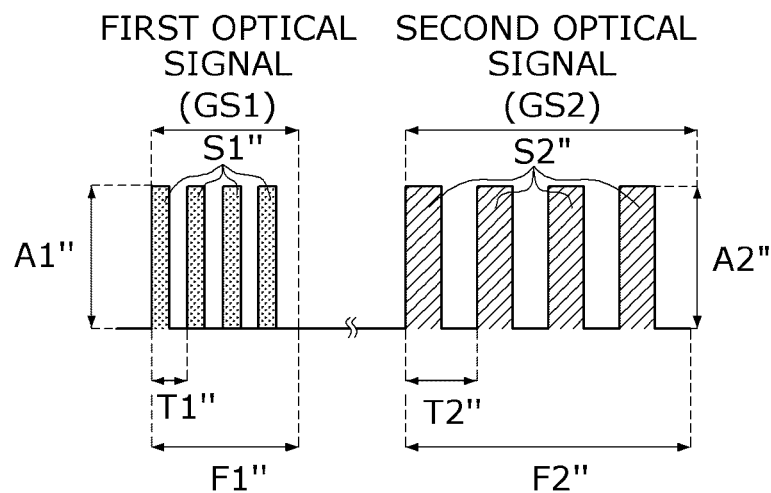
[Fig.9]
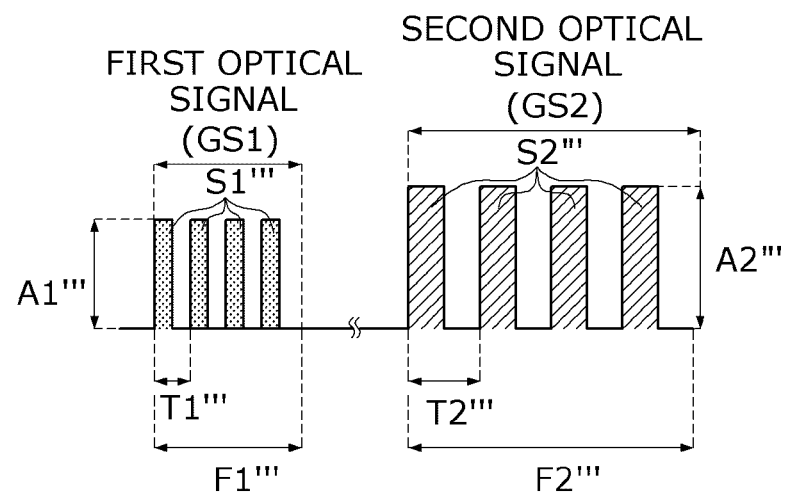

[Fig.10]
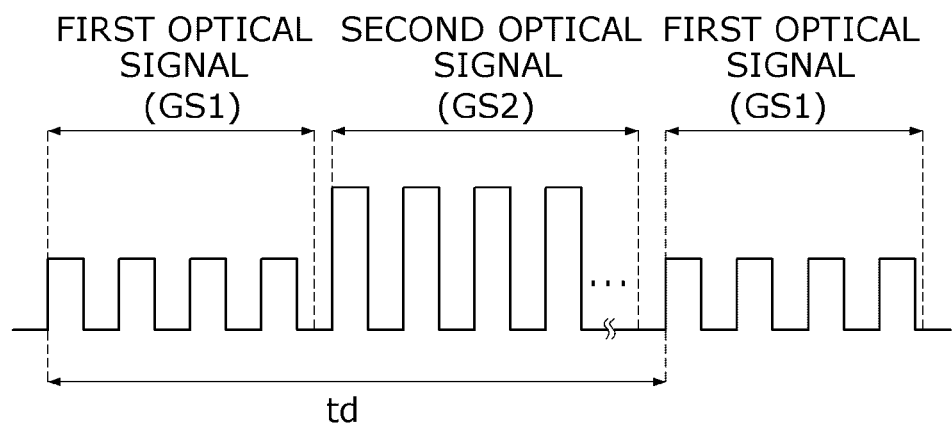
[Fig.11]
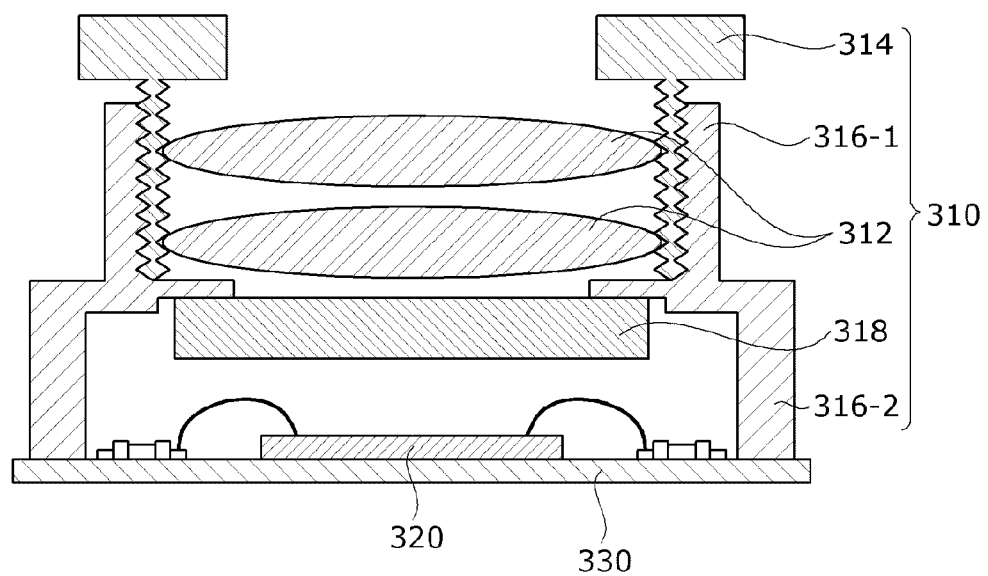

[Fig.12]
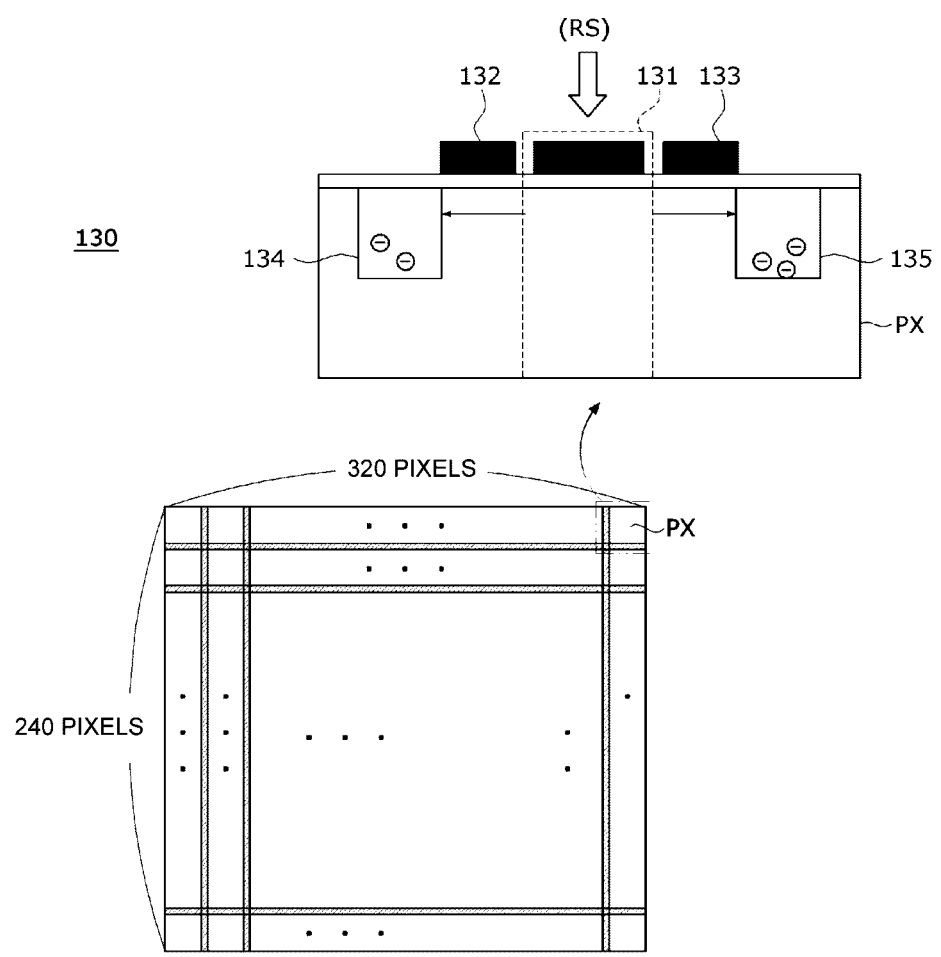

[Fig.13]
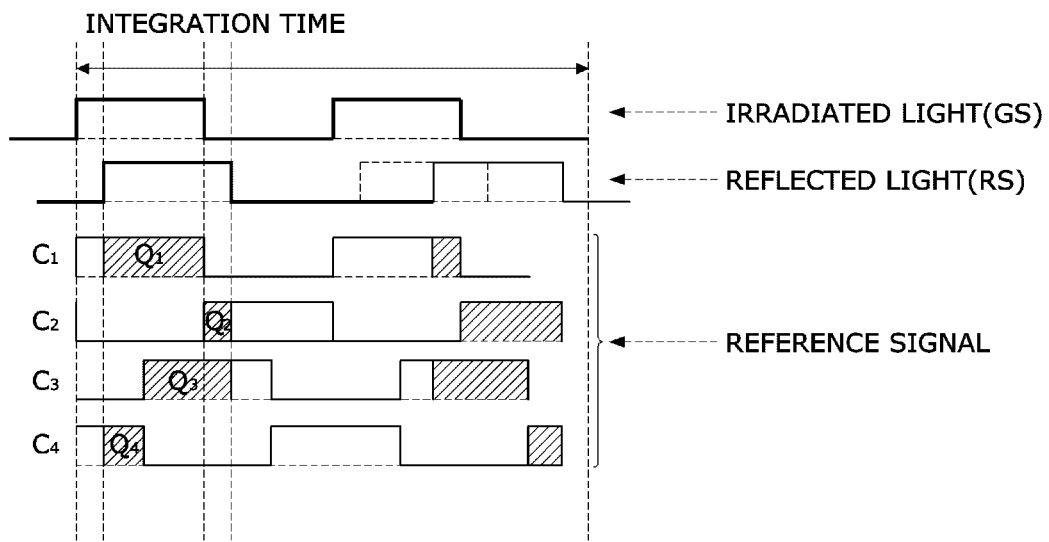
[Fig.14]
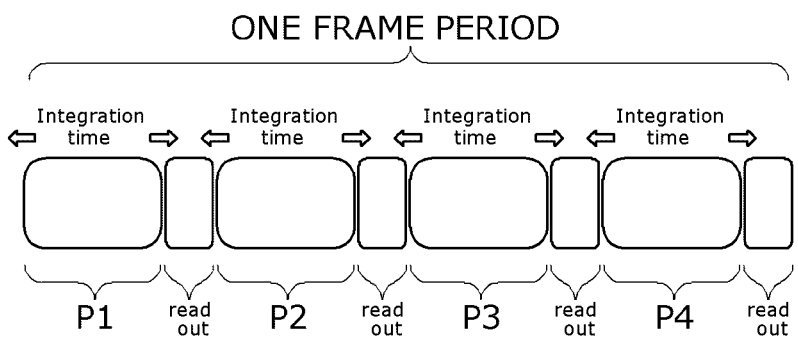

[Fig.15]
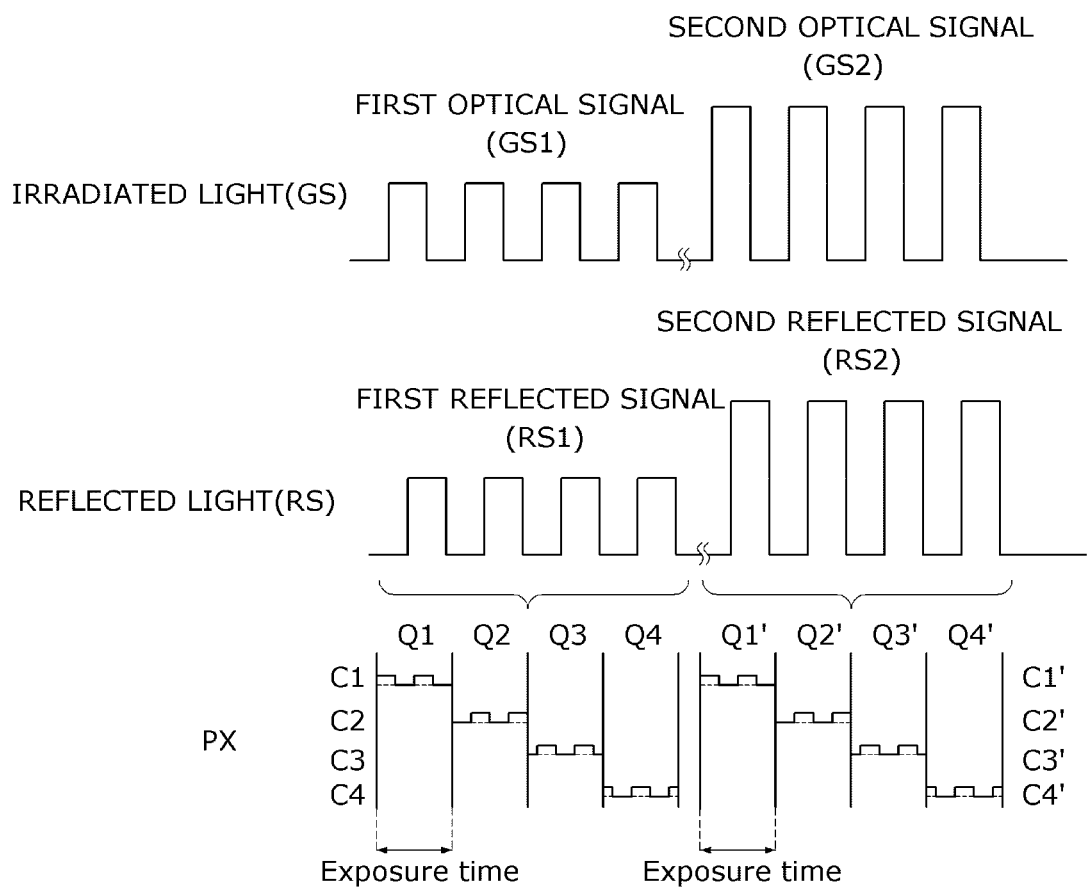

[Fig.16]
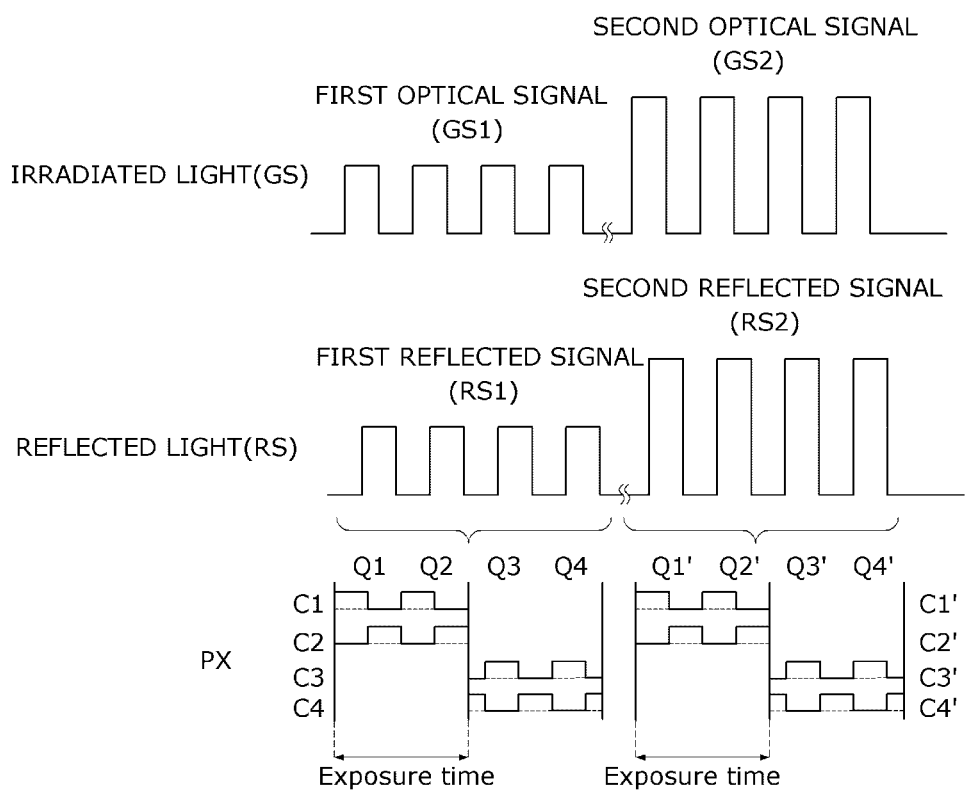

[Fig.17]
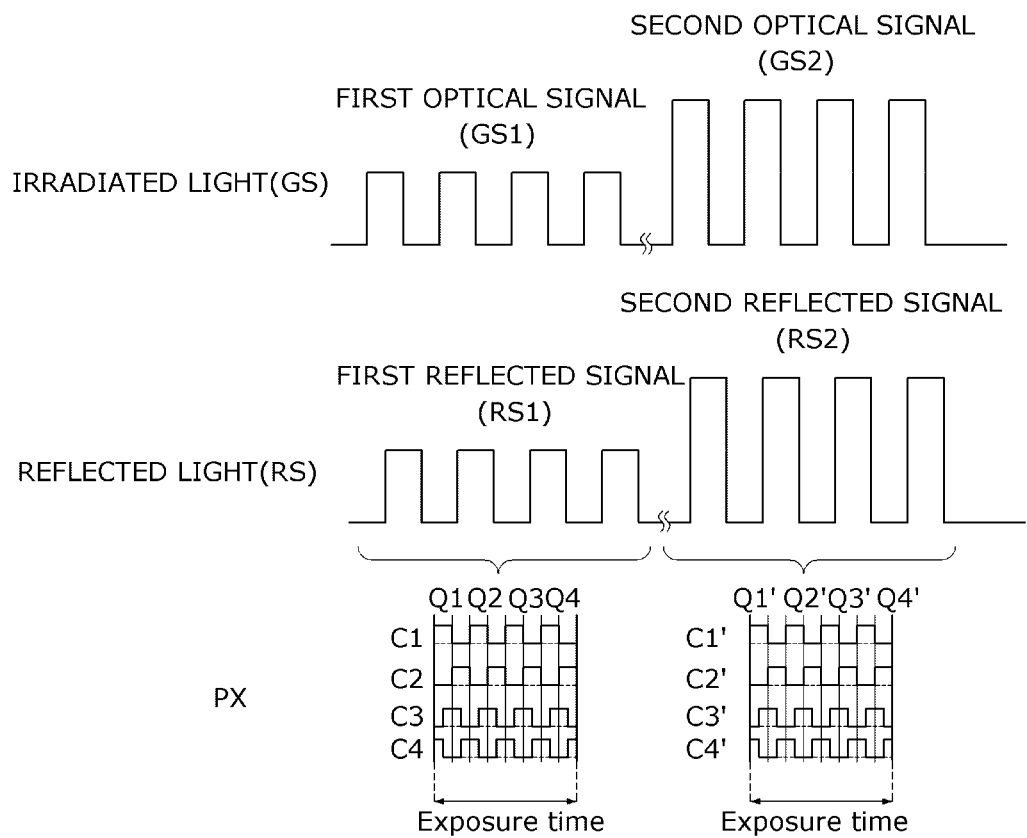

[Fig.18]
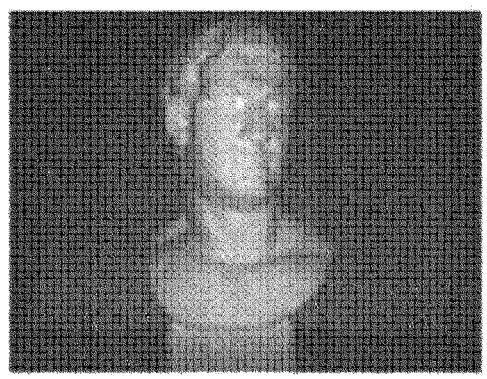
Raw($x_0$)
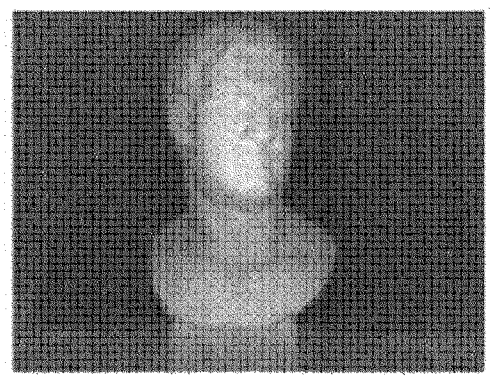
Raw($x_{90}$)
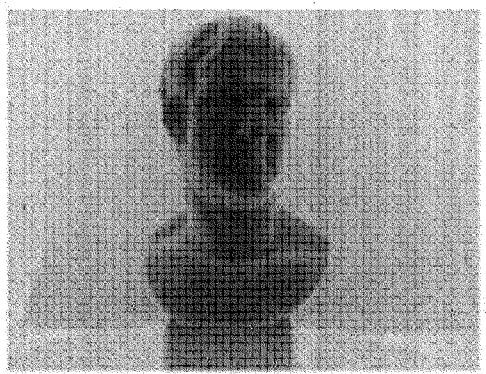
Raw($x_{180}$)
Raw($x_{270}$)

[Fig.19]

[Fig.20]
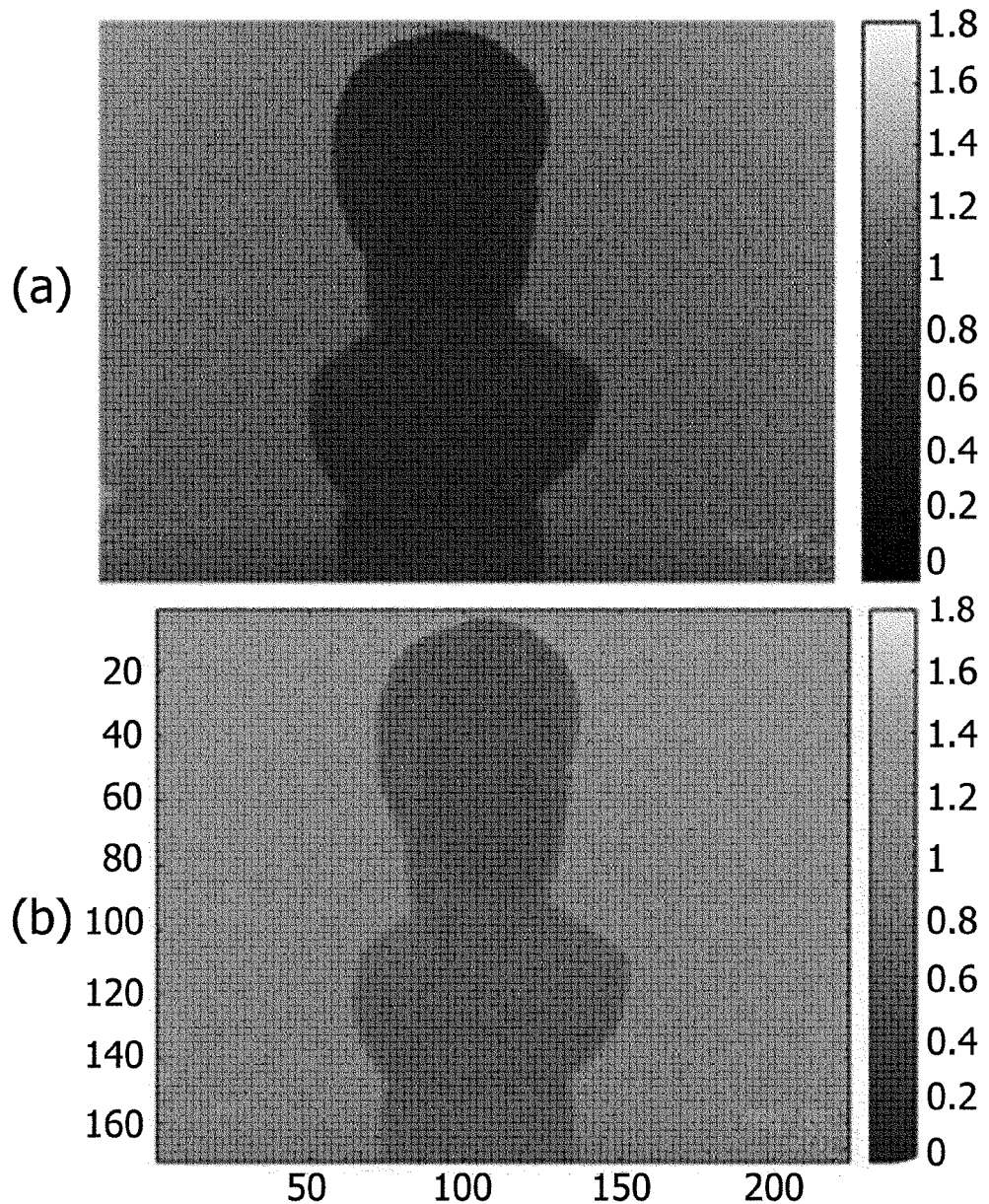

[Fig.21]
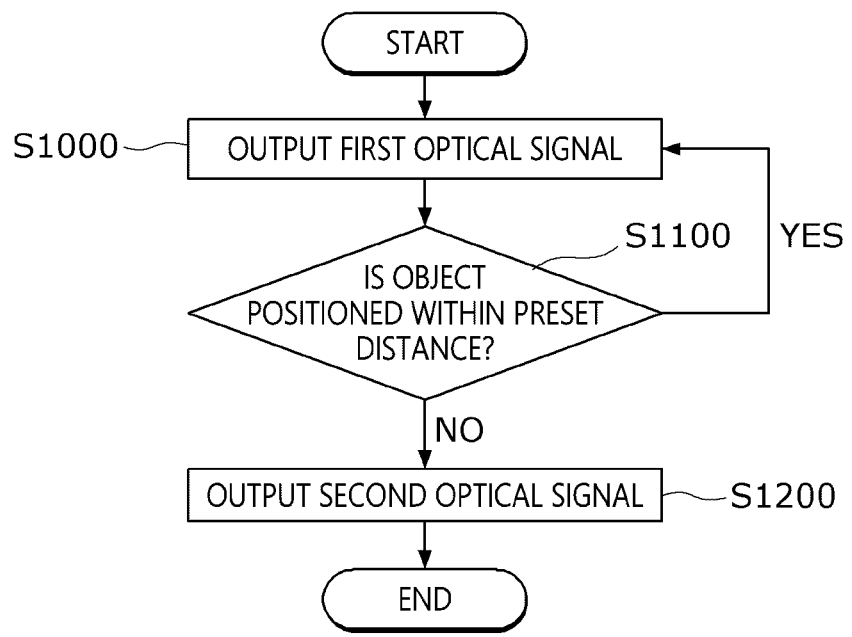

[Fig.22]
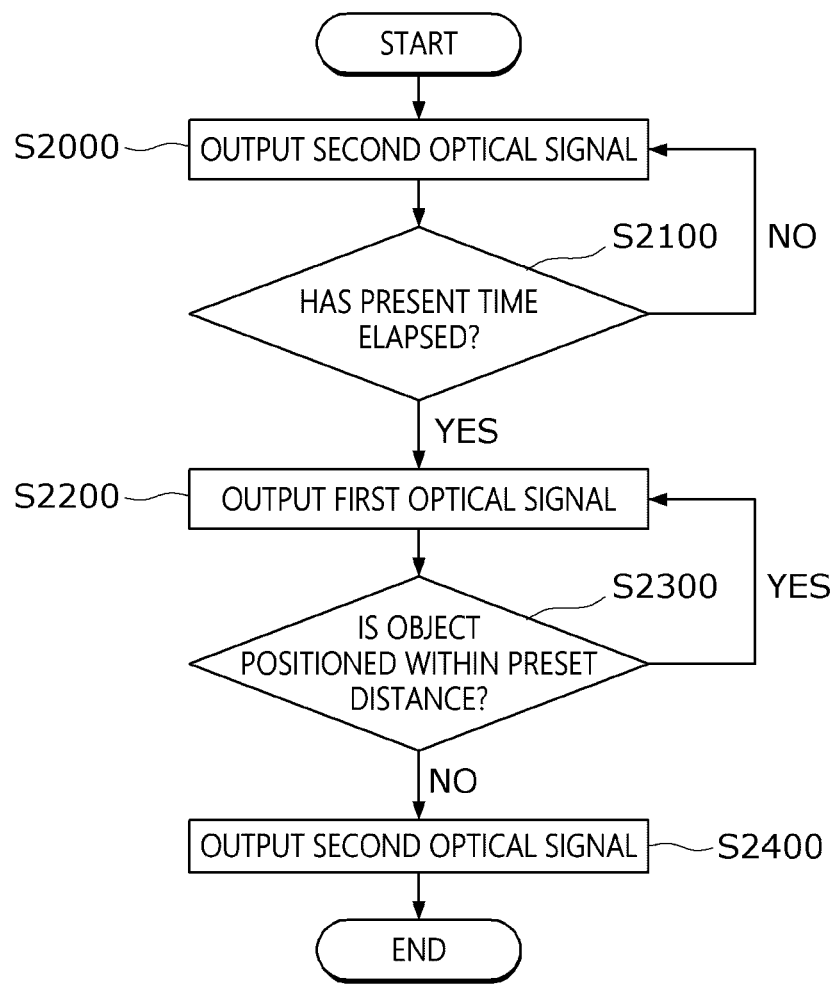

CAMERA MODULE OUTPUTTING DIFFERENT OPTICAL SIGNALS BASED ON DEPTH OF OBJECT

CROSS REFERENCE TO RELATED APPLICATIONS

This application is the National Phase of PCT International Application No. PCT/KR2020/006266, filed on May 13, 2020, which claims priority under 35 U.S.C. 119(a) to Patent Application No. 10-2019-0055720, filed in the Republic of Korea on May 13, 2019, all of which are hereby expressly incorporated by reference into the present application.

TECHNICAL FIELD

The present invention relates to a camera module for extracting distance information.

BACKGROUND ART

Three-dimensional content is being applied in many fields such as education, manufacturing, and autonomous driving fields as well as game and culture fields, and distance information (depth map) is required to acquire three-dimensional content. Distance information is information that indicates a spatial distance and refers to perspective information of a point with respect to another point in a two-dimensional image.

As methods of acquiring distance information, a method of projecting infrared (IR) structured light onto an object, a method using a stereo camera, a time-of-flight (TOF) method, and the like are being used. According to the TOF method, a distance to an object is calculated using information about light that is emitted and reflected. The greatest advantage of the ToF method is that distance information about a three-dimensional space is quickly provided in real time. In addition, accurate distance information may be acquired without a user applying a separate algorithm or performing hardware correction. Furthermore, accurate distance information may be acquired even in the measurement for a very close subject or a moving subject.

However, when a certain amount of light is irradiated onto a very close object (for example, skin or eye) for a predetermined time, there is a problem in that it is difficult to secure the safety of the object.

DISCLOSURE

[Technical Problem]

The present invention is directed to providing a camera module which extracts distance information using a time-of-flight (TOF) method.

The present invention is also directed to providing a camera module which accurately determines a distance to an object while easily securing the safety of the object.

The present invention is also directed to providing a camera module with improved power efficiency when a short distance to an object is determined.

[Technical Solution]

According to an exemplary embodiment of the present invention, a camera module includes an optical output unit configured to output a first optical signal and a second optical signal to an object, a sensor configured to receive a first reflected optical signal which is the first optical signal reflected by the object, and a control unit configured to acquire first distance information for the object using the first optical signal and the first reflected optical signal, wherein an output power of the first optical signal is less than an output power of the second optical signal, and the control unit determines whether to output the second optical signal using the first distance information.

When the distance information is less than a preset value, the control unit may control the first optical signal to output, and when the distance information is greater than the preset value, the control unit may control the second optical signal to output.

The optical output unit may include a first channel unit and a second channel unit, and the second channel unit may include a greater number of light sources than the first channel unit.

The first optical signal may be output from the first channel unit, and the second optical signal may be output from the second channel unit.

The optical output unit may include a plurality of light sources, and an output power of the plurality of light sources when the second optical signal is output is greater than that when the first optical signal is output.

A period of the first optical signal may be shorter than a period of the second optical signal.

The optical output unit may output a frame signal, which is a minimum unit for calculating the first distance information, in a preset period.

The control unit may acquire second distance information for the object using the second optical signal.

The optical output unit may alternately output a frame signal of the first optical signal and a frame signal of the second optical signal.

The preset value may be a value corresponding to 10 cm.

When the first reflected optical signal received by the sensor is received in an amount that is less than or equal to a first reception light amount, the second light signal may be output.

When the first reflected optical signal received by the sensor is received in an amount that is less than or equal to a second reception amount less than the first reception light amount or when the first reflected optical signal is not received, the output of the first optical signal may be turned off According to an exemplary embodiment of the present invention, a camera module includes an optical output unit configured to output a first optical signal and a second optical signal to an object, a sensor configured to receive a first reflected optical signal which is the first optical signal reflected by the object, and a control unit configured to output the second optical signal when distance information acquired using the first optical signal and the first reflected optical signal is greater than a preset value and configured to output the first output signal when the distance information is less than the preset value, wherein three-dimensional (3D) information of the object is acquired using the second optical signal.

[Advantageous Effects]

According to exemplary embodiments of the present invention, a distance to an object can be accurately determined to easily secure the safety of the object.

In addition, a distance to an object can determined using a low output power prepulse, and then, a main pulse having a high output power can be output, thereby securing the safety of the object and also increasing a measurable distance.

Furthermore, it is possible to accurately determine a distance to an object positioned at a short distance.

In addition, power consumption can be reduced when distance information is generated.

DESCRIPTION OF DRAWINGS

FIG. 1 is a diagram illustrating a conceptual diagram of a camera module according to an exemplary embodiment.

FIG. 2 is a diagram illustrating an optical output unit according to an exemplary embodiment.

FIG. 3 is a diagram illustrating optical signals of an optical output unit according to an exemplary embodiment.

FIG. 4 is a diagram illustrating an optical output unit according to an exemplary embodiment.

FIG. 5 is a diagram for describing an amount of irradiance according to a distance to a first channel unit in FIG. 4.

FIG. 6 is a diagram for describing an amount of irradiance according to a distance to a second channel unit in FIG. 4.

FIG. 7 is a diagram illustrating an optical output unit and optical signals according to another exemplary embodiment.

FIG. 8 is a diagram illustrating optical signals of an optical output unit according to still another exemplary embodiment.

FIG. 9 is a diagram illustrating optical signals of an optical output unit according to yet another exemplary embodiment.

FIG. 10 is a diagram illustrating optical signals of an optical output unit according to an exemplary embodiment.

FIG. 11 is a cross-sectional view of a camera module according to an exemplary embodiment.

FIG. 12 is a diagram for describing a sensor according to an exemplary embodiment.

FIG. 13 is a diagram for describing a process of generating an electrical signal in a sensor according to an exemplary embodiment.

FIG. 14 is a timing diagram of one frame period for which a distance image is generated in a sensor according to an exemplary embodiment.

FIG. 15 is a diagram for describing the driving of a sensor according to an exemplary embodiment.

FIG. 16 is a diagram for describing the driving of a sensor according to another exemplary embodiment FIG. 17 is a diagram for describing the driving of a sensor according to still another exemplary embodiment.

FIG. 18 shows raw images for four phases acquired from a camera module according to an exemplary embodiment.

FIG. 19 is an amplitude image acquired from a camera module according to an exemplary embodiment.

FIG. 20 shows distance images acquired from a camera module according to an exemplary embodiment.

FIG. 21 is a flowchart for describing a method of driving a camera module according to an exemplary embodiment.

FIG. 22 is a flowchart for describing a method of driving a camera module according to another exemplary embodiment.

MODES OF THE INVENTION

Hereinafter, exemplary embodiments of the present invention will be described in detail with reference to the accompanying drawings.

However, the technical spirit of the present invention is not limited to some exemplary embodiments disclosed below but can be implemented in various different forms. Without departing from the technical spirit of the present invention, one or more of components may be selectively combined and substituted to be used between the exemplary embodiments.

Also, unless defined otherwise, terms (including technical and scientific terms) used herein may be interpreted as having the same meaning as commonly understood by one of ordinary skill in the art to which the present invention belongs. General terms like those defined in a dictionary may be interpreted in consideration of the contextual meaning of the related technology.

Furthermore, the terms used herein are intended to illustrate exemplary embodiments but are not intended to limit the present invention.

In the present specification, the terms in singular form may include the plural forms unless otherwise specified. When "at least one (or one or more) of A, B, and C" is expressed, it may include one or more of all possible combinations of A, B, and C.

In addition, terms such as "first," "second," "A," "B," "(a)," and "(b)" may be used herein to describe components of the exemplary embodiments of the present invention.

Each of the terms is not used to define an essence, order, or sequence of a corresponding component but used merely to distinguish the corresponding component from other components.

In a case in which one component is described as being "connected," "coupled," or "joined" to another component, such a description may include both a case in which one component is "connected," "coupled," and "joined" directly to another component and a case in which one component is "connected," "coupled," and "joined" to another component with still another component disposed between one component and another component.

In addition, in a case in which any one component is described as being formed or disposed "on (or under)" another component, such a description includes both a case in which the two components are formed to be in direct contact with each other and a case in which the two components are in indirect contact with each other such that one or more other components are interposed between the two components.

In addition, in a case in which one component is described as being formed "on (or under)" another component, such a description may include a case in which the one component is formed at an upper side or a lower side with respect to another component.

A camera module according to an exemplary embodiment to be described below may be used as an optical device or a part of the optical device. First, the optical device may include any one of a cellular phone, a mobile phone, a smartphone, a portable smart device, a digital camera, a laptop computer, a digital broadcasting terminal, a personal digital assistant (PDA), a portable multimedia player (PMP), and a navigation device. However, types of the optical device are not limited thereto, and any device for capturing an image or photo may be included in the optical device.

The optical device may include a main body. The main body may have a bar shape. Alternatively, the main body may have one of various structures such as a slide type, a folder type, a swing type, and a swivel type in which two or more sub-bodies are coupled to be relatively movable. The main body may include a case (casing, housing, or cover) forming an exterior. For example, the main body may include a front case and a rear case. Various electronic components of the optical device may be embedded in a space formed between the front case and the rear case.

The optical device may include a display. The display may be disposed on one surface of the main body of the optical device. The display may output an image. The display may output an image captured by a camera.

The optical device may include a camera. The camera may include a time-of flight (ToF) camera module. The ToF camera module may be disposed on a front surface of the main body of the optical device. In this case, the ToF camera module may be used for various types of biometric recognition such as face recognition, iris recognition, and vein recognition of a user for security authentication of the optical device.

FIG. 1 is a conceptual diagram illustrating a camera module according to an exemplary embodiment.

Referring to FIG. 1, a camera module 100 according to the exemplary embodiment may include an optical output unit 110, an optical unit 120, a sensor 130, and a control unit 140.

First, the optical output unit 110 may generate and irradiate light toward an object O in a desired signal form. Specifically, the optical output unit 110 may be any one of a light-emitting module, a light-emitting unit, a light-emitting assembly, and a light-emitting device.

The optical output unit 110 may generate and output an optical signal in the form of a pulse wave or a continuous wave. Here, the continuous wave may be in the form of a sinusoid wave or a square wave but is not necessarily limited thereto.

In addition, since the optical output unit 110 generates an optical signal in the form of a pulse wave or a continuous wave, the camera module 100 may use a phase difference or a time difference between the optical signal output from the optical output unit 110 and a reflected optical signal reflected from the object and then input to the camera module 100. In an exemplary embodiment, the camera module 100 may calculate a distance to the object using a phase difference or a time difference between reflected optical signals.

In the present specification, irradiated light GS may refer to an optical signal that is output from the optical output unit 110 and incident on the object, and reflected light RS may refer to an optical signal which is irradiated light that is output from the optical output unit 110, reaches the object, is reflected from the object, and is input to the camera module 100. The irradiated light GS may be incident light from the point of view of the object, and the reflected light RS may be input light from the point of view of the camera module. Hereinafter, the irradiated light will be described as an optical signal (for example, a first optical signal or a second optical signal) or an irradiated optical signal, and the reflected light will be described as a reflected optical signal.

In addition, the optical output unit 110 irradiates the generated optical signal onto the object for a predetermined integration time. Here, the integration time refers to a time period for which a pixel receives reflected light to generate electric charges in order to acquire distance information. The integration time may be provided as one or more integration times, and one or more integration times may constitute a frame period. A detailed description thereof will be provided below.

In addition, when a plurality of frames are generated, the above-described integration time may be present a plurality of times. For example, the integration time may be repeated. For example, when the camera module 100 photographs the object at 20 frames per second (FPS), an integration time may be 1/20 [sec]. When 100 frames are generated and an integration time and a frame period are the same, the integration time may be repeated 100 times. However, the present invention is not limited thereto, and a plurality of integration times may be present in one frame period.

The optical output unit 110 may generate not only an output optical signal having a predetermined frequency but also a plurality of optical signals having different frequencies. In addition, the optical output unit 110 may sequentially and repeatedly output a plurality of optical signals having different frequencies. Alternatively, the optical output unit 110 may simultaneously output a plurality of optical signals having different frequencies. For such an operation, in an exemplary embodiment, the optical output unit 110 may include a light source E (see FIG. 2), a light change unit (not shown), and a light collection unit (not shown).

First, the light source E may generate light. The light generated by the light source E may be infrared light having a wavelength of 770 nm to 3,000 nm or may be visible light having a wavelength of 380 nm to 770 nm. The light source E may include a light-emitting diode (LED) and may have a form in which a plurality of LEDs are arranged according to a certain pattern. In addition, the light source E may also include an organic light-emitting diode (OLED) or a laser diode (LD). Alternatively, the light source E may also be a vertical cavity surface emitting laser (VCSEL). The VCSEL may be one of laser diodes which convert an electrical signal into an optical signal and may use a wavelength of about 800 nm to 1,000 nm, for example, a wavelength of about 850 nm or about 940 nm.

The light source E is repeatedly turned on/off at a certain time interval to generate an optical signal in the form of a pulse wave or a continuous wave. The certain time interval may be related to a frequency of an optical signal. Turn-on/off of the light source E may be controlled by the light change unit.

The light change unit (not shown) may control turn-on/off of the light source E and controls the light source E to generate an optical signal in the form of a continuous wave or a pulse wave. That is, the light change unit (not shown) may control the light source E to generate an optical signal in the form of a continuous wave or a pulse wave through frequency modulation, pulse modulation, or the like.

The light collection unit (not shown) may change an optical path such that light generated from the light source E has an array spot. For example, the light collection unit (not shown) may include an imaging lens, a micro lens array, or a diffractive optical element (DOE). Due to such a configuration, light emitted toward the object O from the camera module 100 may have a plurality of array spots. Thus, even when a distance between the camera module 100 and the object O is increased, light emitted from the camera module 100 may easily reach the object O due to being collected. Accordingly, the camera module 100 according to the exemplary embodiment may enable long-distance light transmission. In this case, the number of the array spots can be variously set, but in the present specification, descriptions will be provided based on that the optical output unit 110 includes the light source E.

In addition, the light change unit may include an actuator. For example, as a lens held by the actuator moves up and down, light may be collected and emitted to the object as point light or may be emitted to the object as planar light.

Meanwhile, the optical unit 120 may include at least one lens. The optical unit 120 may collect a reflected optical signal reflected from the object through at least one lens to transmit the collected optical signal to the sensor 130.

At least one lens of the optical unit 120 may include a solid lens. In addition, at least one lens may include a variable lens. The variable lens may be a focus-variable lens. In addition, the variable lens may be a focus-adjustable lens. Furthermore, the variable lens may be at least one of a liquid lens, a polymer lens, a liquid crystal lens, a voice coil motor (VCM) type, and a shape memory array (SMA) type. The liquid lens may include a liquid lens including one type of liquid and a liquid lens including two types of liquids. In the liquid lens including one type of liquid, a focus may be varied by adjusting a membrane disposed at a position corresponding to the liquid, and for example, the focus may be varied by pressing the membrane with an electromagnetic force of a magnet and a coil. The liquid lens including two types of liquids may include a conductive liquid and a non-conductive liquid, and an interface formed between the conductive liquid and the non-conductive liquid may be adjusted using a voltage applied to the liquid lens. In the polymer lens, a focus may be varied by controlling a polymer material through a piezo-driver or the like. In the liquid crystal lens, a focus may be varied by controlling a liquid crystal with an electromagnetic force. In the VCM type, a focus may be varied by controlling a solid lens or a lens assembly including a solid lens through an electromagnetic force between a magnet and a coil. In the SMA type, a focus may be varied by controlling a solid lens or a lens assembly including a solid lens using an SMA. In addition, the optical unit 120 may include an optical plate. The optical plate may be a light transmitting plate.

In addition, the optical unit 120 may include a filter (not shown) that transmits light in a specific wavelength range. In an exemplary embodiment, the filter (not shown) of the optical unit 120 may transmit only light in a preset wavelength band and may block light other than light in the preset wavelength band. In this case, the filter (not shown) may partially pass light in an infrared (IR) band. For example, the filter (not shown) may include an IR band pass filter that partially passes light having a wavelength of 780 nm to 1,000 nm.

The sensor 130 may generate an electrical signal using an input optical signal that is collected through the optical unit 120. In an exemplary embodiment, the sensor 130 may absorb an input optical signal in synchronization with an on/off period of the optical output unit 110 for each irradiated light GS. For example, the sensor 130 may absorb light in each of an in-phase and an out-phase with an optical signal output from the optical output unit 110.

In addition, the sensor 130 may generate an electrical signal corresponding to each reference signal using a plurality of reference signals having different phases. For example, the electrical signal may be a signal obtained by mixing each reference signal and reflected light, and the mixing may include convolution, multiplication, or the like. In addition, a frequency of the reference signal may be set to correspond to a frequency of an optical signal output from the optical output unit 110. In an exemplary embodiment, the frequency of the reference signal may be the same as the frequency of the optical signal of the optical output unit 110.

As described above, when the optical output unit 110 generates an optical signal with a plurality of frequencies, the sensor 130 may generate an electrical signal according to a plurality of reference signals corresponding to each frequency of the optical signal. For example, a switching operation of a gate may be performed in each pixel of the sensor 130 in response to the plurality of reference signals, an electric charge of an electrical signal generated by absorbing the reflected optical signal RS may be charged in a charging element such as a capacitor according to the switching operation of the gate, and thus, the electrical signal (charged with electric charge) may be finally output. For example, the electrical signal may correspond to an electric charge amount or a voltage for each reference signal and may be output for each pixel.

The control unit 140 may acquire information about a distance to the object using a phase difference between the irradiated light GS and the reflected optical signal RS. Here, the phase difference may be calculated from an electrical signal output from the sensor 130.

In addition, in an exemplary embodiment, in order to detect the object O positioned at a short distance from the camera module 100, the control unit 140 may acquire information (first distance information) about a distance to the object through preprocessing by using a phase difference between the first optical signal output from the optical output unit 110 and a first reflected optical signal corresponding to the first optical signal and may determine whether the optical output unit 110 irradiates the second optical signal, which is an optical signal irradiated after the first optical signal, according to an acquired distance to the object.

In other words, when a distance between the object O and the camera module 100 is very short, an amount of reflected irradiance may be great, and thus, an electrical signal generated by a reflected optical signal may have a great magnitude. For example, since the electrical signal has a magnitude greater than a reference value, it may be difficult for the control unit to accurately calculate information about a distance from each pixel. In addition, when an adjacent object is a part of the human body such as skin or eyes, it may be difficult to secure safety. Accordingly, when a distance is measured, the control unit according to the exemplary embodiment may primarily irradiate an optical signal with low irradiance (here, the first optical signal) and then may determine the output power of an optical signal with high irradiance (here, the second optical signal), thereby easily securing safety with respect to the optical signal. A detailed description thereof will be provided below.

Distance information acquired through the first optical signal and the first reflected optical signal will be described as first distance information, and distance information acquired through the second optical signal and a second reflected optical signal will be described as second distance information. The first reflected optical signal is a signal which is the first optical signal reflected from the object and input to the camera module, and the second reflected optical signal is a signal which is the second optical signal reflected from the object and input to the camera module.

In addition, the control unit 140 may control the optical unit 120 to shift an optical path of a reflected optical signal (for example, the first reflected optical signal or the second reflected optical signal). Due to such a configuration, it is possible to output a plurality of pieces of image data for extracting a high resolution distance image.

In addition, the camera module 100 according to the exemplary embodiment may further include a calculation unit (not shown). The calculation unit (not shown) may use an electrical signal received from the sensor 130 and combine the plurality of pieces of image data extracted from the control unit 140 to calculate depth information having high resolution that is higher than that of the image data. In addition, the calculation unit (not shown) may be disposed in an optical device including the camera module or in the camera module 100 as shown to perform calculation. Hereinafter, descriptions will be provided based on that the calculation unit (not shown) is disposed in the camera module 100.

The calculation unit (not shown) may receive information detected by the sensor 130 from the camera module 100 to perform calculation thereon. The calculation unit (not shown) may receive a plurality of pieces of low resolution information using an electrical signal received from the sensor 130 and generate high resolution distance information using the plurality of pieces of low resolution information. For example, the high resolution distance information may be generated by rearranging the plurality of pieces of low resolution information.

In this case, the calculation unit (not shown) may calculate a distance between the object and the camera module 100 using a time difference between an optical signal output from the optical output unit and an optical signal received by the sensor or using a plurality of pieces of information acquired during a plurality of integration times of the sensor, for which an effective area of the sensor is exposed in different phases.

The term "~unit" used in the present exemplary embodiment refers to a software or hardware component, such as a field-programmable gate array (FPGA) or an application-specific integrated circuit (ASIC), which executes certain tasks. However, the term "~unit" is not limited to the software or hardware component. A "~unit" may be configured to reside in an addressable storage medium and configured to operate one or more processors. Thus, a "~unit" may include, by way of example, components such as software components, object-oriented software components, class components and task components, processes, functions, attributes, procedures, subroutines, segments of program code, drivers, firmware, microcode, circuitry, data, databases, database structures, tables, arrays, and parameters. The functionality provided in the components and "~units" may be combined into fewer components and "~units" or further separated into additional components and units. In addition, the components and units may be implemented such that the components and "~units" operate one or more central processing units (CPUs) in a device or a security multimedia card.

FIG. 2 is a diagram illustrating an optical output unit according to an exemplary embodiment, and FIG. 3 is a diagram illustrating optical signals of an optical output unit according to an exemplary embodiment.

Referring to FIGS. 2 and 3, as described above, an optical output unit 110 according to the exemplary embodiment may include a plurality of light sources E. As an example, the plurality of light sources E may be arranged in the form of a matrix or the like. The optical output unit 110 according to the exemplary embodiment may output a first optical signal GS1 and a second optical signal GS2. That is, each light source E may output the first optical signal GS1 and the second optical signal GS2. However, hereinafter, the first optical signal GS1 and the second optical signal GS2 will be described as all optical signals output from the optical output unit 110.

In an exemplary embodiment, the first optical signal GS1 may have a phase that is ahead of that of the second optical signal GS2. In other words, the first optical signal GS1 may be output in advance of the second optical signal GS2.

An output power of the first optical signal GS1 (hereinafter, used interchangeably with a first output power S1) may be less than an output power of the second optical signal GS2 (hereinafter, used interchangeably with a second output power S2). That is, the first output power S1 may be less than the second output power S2. Here, the first output power S1 is an irradiance (mW/cm$^2$) of the first optical signal GS1, and the second output power S2 is an irradiance (mW/cm$^2$) of the second optical signal GS2. Irradiance refers to a light output power per unit area.

That is, a camera module according to an exemplary embodiment may irradiate the first optical signal GS1 having irradiance less than that of the second optical signal GS2 in advance of the second optical signal GS2 to acquire distance information (or a distance). Accordingly, when an object O is very close to the camera module, the camera module may determine whether to irradiate the second optical signal GS2 which may be more harmful to the human body or the like at a corresponding distance, thereby securing the safety of the camera module.

The first optical signal GS1 may have a first magnitude A1, a first period T1, and a first frame period F1. The first magnitude A1 of the first optical signal GS1 may be an amplitude of the first optical signal GS1, the first period T1 of the first optical signal GS1 may be a signal period, and the first frame period F1 of the first optical signal GS1 may be a period for which distance information is calculable. The product of the first magnitude A1 and the first period T1 in the first optical signal GS1 may be the total irradiance as the total output power of the first optical signal G1.

Similarly, the second optical signal GS2 may have a second magnitude A2, a second period T2, and a second frame period F2. The second magnitude A2 of the second optical signal GS2 may be an amplitude of the second optical signal GS2, the second period T2 of the second optical signal GS2 may be a signal period, and the second frame period F2 of the second optical signal GS2 may be a period for which distance information is calculable.

In this case, in an exemplary embodiment, the first magnitude A1 of the first optical signal GS1 may be less than the second magnitude A2 of the second optical signal GS2. The first period T1 of the first optical signal GS1 may be the same as the second period T2 of the second optical signal GS2. In addition, the first frame period F1 of the first optical signal GS1 may be the same as the second frame period F2 of the second optical signal GS2. Similarly, the product of the second magnitude A2 and the second period T2 in the second optical signal GS2 may be the total irradiance as the total output power of the second optical signal G2. Accordingly, since the first optical signal GS1 has an amplitude that is less than that of the second optical signal GS2, the first output power Si may be smaller than the second output power S2.

FIG. 4 is a diagram illustrating an optical output unit according to an exemplary embodiment, FIG. 5 is a diagram for describing an amount of irradiance according to a distance to a first channel unit in FIG. 4, and FIG. 6 is a diagram for describing an amount of irradiance according to a distance to a second channel unit in FIG. 4.

Referring to FIG. 4, an optical output unit 110 according to the exemplary embodiment may be divided according to the number of light sources E disposed in an area and may include a first channel unit CH1 and a second channel unit CH2.

First, both of the first channel unit CH1 and the second channel unit CH2 may include one or more light sources E. In addition, the number of the light sources E in the first channel unit CH1 may be less than the number of the light sources E in the second channel unit CH2.

The first channel unit CH1 may at least partially overlap the second channel unit CH2. However, the present invention is not limited thereto, and the first channel unit CH1 and the second channel unit CH2 may be disposed to be spaced apart from each other.

In addition, in an exemplary embodiment, a first optical signal may be an optical signal irradiated from the first channel unit CH1, and a second optical signal may be an optical signal irradiated from the second channel unit CH2. Accordingly, since the number of the light sources E in the first channel unit CH1 is less than the number of the light sources E in the second channel unit CH2, as described above, a first output power of the first light signal may be less than a second output power of the second optical signal.

In other words, in order for the first output power to be less than the second output power, an area of the optical output unit 110 may be partitioned and driven such that irradiance is different. Due to such a configuration, a camera module can accurately measure an adjacent object and secure the safety with respect to an optical signal of the optical output unit 110.

Referring to FIGS. 5 and 6, when the optical output unit included 203 light sources within 3 mm×3 mm and was divided into the first channel unit CH1 having one light source and the second channel unit CH2 having 203 light sources, and each of the first channel unit CH1 and the second channel unit CH2 was driven, irradiance according to a distance was measured. FIG. 5 and Table 1 below show irradiance according to a distance when the first channel unit CH1 is driven, and FIG. 6 and Table 2 below show irradiance according to a distance when the second channel unit CH2 is driven.

TABLE 1

| Distance (mm) | Irradiance (mW/cm$^2$) |
| --- | --- |
| 350 | 62.53 |
| 550 | 23.45 |
| 750 | 12.55 |
| 1000 | 7.05 |

TABLE 2

| Distance (mm) | Irradiance (mW/cm$^2$) |
| --- | --- |
| 5 | 1666.60 |
| 25 | 58.57 |
| 50 | 14.66 |
| 75 | 6.38 |
| 100 | 3.59 |

That is, at the same distance, an amount of irradiance of the first channel unit CH1 may be less than an amount of irradiance of the second channel unit CH2. In addition, a distance to a point at which the first channel unit CH1 has the same irradiance as the second channel unit CH2 may be shorter than a distance in the second channel unit CH2. In other words, since irradiance is very great when the camera module according to the exemplary embodiment is adjacent to an object, in order to accurately measure a distance and secure the safety of the human body, the first optical signal and the second optical signal may be output by being distinguished based on the number of the light sources. FIG. 7 is a diagram illustrating an optical output unit and optical signals according to another exemplary embodiment.

Referring to FIG. 7, an optical output unit 110 according to another exemplary embodiment may output a first optical signal GS1 and a second optical signal GS2 by driving light sources of the same channel unit.

As an example, the optical output unit 110 may include a third channel unit CH3 including all light sources, and the third channel unit CH3 may be driven to output the first optical signal GS1 and the second optical signal GS2. That is, the first optical signal GS1 and the second optical signal GS2 may be optical signals irradiated from the same number of light sources.

However, in another exemplary embodiment, an amplitude of the first optical signal GS1 of each light source may be less than an amplitude of the second optical signal GS2 of each light source. In FIG. 7, the first optical signal GS1 and the second optical signal GS2 are illustrated with one light source but refer to all of optical signals output from the third channel unit CH3.

Accordingly, even when the first optical signal GS1 and the second optical signal GS2 are output from the same channel unit, since a first magnitude A1' of the first optical signal GS1 is less than a second magnitude A2 of the second optical signal GS2, a first output power S1' of the first optical signal GS1 may be less than a second output power A2' of the second optical signal GS2. That is, in the optical output unit 110, when the second optical signal GS2 is output, a light output power of each light source may be greater as compared with when the first optical signal GS1 is output.

In this case, a period T1' of the first optical signal GS1 may be the same as a period T2' of the second optical signal GS2. Accordingly, by adjusting a driving signal (for example, a driving current or a driving voltage) applied to the light source of the optical output unit 110, an amount of irradiance of the optical output unit can be adjusted through low power and easy operation.

FIG. 8 is a diagram illustrating optical signals of an optical output unit according to still another exemplary embodiment.

Referring to FIG. 8, as described above, the optical output unit according to still another exemplary embodiment may output a first optical signal GS1 in advance of a second optical signal GS2, and a first output power S1" may be less than a second output power S2".

In this case, a first magnitude A1" of the first optical signal GS1 may be the same as a second magnitude A2" of the second optical signal GS2. For example, the first optical signal GS1 and the second optical signal GS2 may be output from the same channel and light sources having the same output power.

However, unlike the magnitudes of the above-described optical signals, a first period T1" of the first optical signal GS1 may be different from a second period T2" of the second optical signal GS2, and the first period T1" may be shorter than the second period T2". Accordingly, a first frame period F1" may be shorter than a second frame period F2".

In addition, in a sensor to be described below, an integration time for a first reflected optical signal may be different from an integration time for a second reflected optical signal, and the integration time for the first reflected optical signal may be shorter than the integration time for the second reflected optical signal.

FIG. 9 is a diagram illustrating optical signals of an optical output unit according to yet another exemplary embodiment.

Referring to FIG. 9, the optical output unit according to yet another exemplary embodiment may output a first optical signal GS1 in advance of a second optical signal GS2, and a first output power S1'" may be less than a second output power S2'".

In this case, a first magnitude A1'" and a first period T1'" of the first optical signal GS1 may be different from a second magnitude A2'" and a second period T2'" of the second optical signal GS2, respectively. In an exemplary embodiment, the first magnitude A1'" may be less than the second magnitude A2'", and the first period T1'" may be shorter than the second period T2'". For example, the first optical signal GS1 and the second optical signal GS2 may be output from different channels or light sources having different output power. In addition, a first frame period F1'" may be different from a second frame period F2''', and the first frame period F1''' may be shorter than the second frame period F2'''.

Furthermore, in addition to the exemplary embodiments described above in the present specification, when any one of the first magnitude A1''' and the first period T1''' is less than any one of the second magnitude A2''' and the second period T2''' and the other one of the first magnitude A1''' and the first period T1''' is greater than the other one of the second magnitude A2''' and the second period T2''', the first output power S1''' may be less than the second output power S2''', and the present invention may include all of such examples.

FIG. 10 is a diagram illustrating optical signals of an optical output unit according to an exemplary embodiment.

Referring to FIG. 10, the optical output unit according to the exemplary embodiment may sequentially output a first optical signal GS1 and a second optical signal GS2 and then output the first optical signal GS1 again.

That is, when a distance to an object measured using the first optical signal GS1 and a first reflected optical signal is recognized to be longer than a preset distance, a control unit may regard the safety of the human body or the like to be secured, thereby irradiating the second optical signal GS2. The control unit may acquire information about a distance to the object using the second optical signal and a second reflected optical signal. The acquisition of distance information will be described in detail below.

In addition, the control unit may control the optical output unit to output the first optical signal GS1 in a preset period. For example, the optical output unit may output the first optical signal GS1 in a first driving period td. Accordingly, a camera module may periodically check a distance between the object and the camera module, and when the distance between the object and the camera module is shorter than a preset distance, the camera module may turn the output of the second optical signal GS2 off so as to secure safety. Accordingly, when a distance to the object is measured, the camera module according to the exemplary embodiment can reduce a risk of safety problems caused by movement or the like.

In addition, as a modified example, the optical output unit may output the first optical signal for each frame period that is a minimum unit of the second optical signal. Accordingly, whether to acquire second distance information according to a distance to the object may be periodically determined using first distance information for the object. In addition, the output power of an optical signal may be determined for each frame period that is a minimum unit, thereby efficiently measuring the second distance information which indicates a distance to a real object which is not safe.

According to the above-described exemplary embodiment, the control unit may output the second optical signal when the first reflected optical signal received by a sensor is received in an amount that is less than or equal to a first reception light amount. Here, the first light reception amount may be set to be an amount harmful to the human body at a point at which a distance to the object is 10 cm.

For example, when a distance to the object is long, since the first reflected optical signal is received in an amount that is less than the first reception light amount (which includes a case in which there is no reflected signal), the control unit may output the second optical signal. Due to such a configuration, it is possible to accurately acquire information about a distance to an object at a longer distance while protecting the human body from an object at a short distance.

In addition, as described above, when an object is positioned very close to the camera module, since a result of the first reflected optical signal may be greater than the first reception light amount, the control unit may not output the second optical signal. In addition, the output of the first optical signal may be turned off. In this case, a case in which a null value due to overcharging of a capacitor to be described below is greater than the first light reception amount will be described.

In addition, when the first reflected optical signal is received in an amount less than or equal to a second reception amount less than the first reception light amount or when the first reflected optical signal is not received, the control unit may turn the output of the first optical signal off. Due to such a configuration, it is possible to secure the safety of the human body at a short distance at which an object may be in contact with the optical output unit.

FIG. 11 is a cross-sectional view of a camera module according to an exemplary embodiment.

Referring to FIG. 11, the camera module according to the exemplary embodiment may include a lens assembly 310, a sensor 320, and a printed circuit board 330. Here, the lens assembly 310 may correspond to the optical unit 120 of FIG. 1, and the sensor 320 may correspond to the sensor 130 of FIG. 1. The control unit 140 of FIG. 1 may be implemented on the printed circuit board 330 or the sensor 320. Although not shown, the optical output unit 110 of FIG. 1 may be disposed on the printed circuit board 330 or may be disposed as a separate component. In addition, the output of an optical signal of the optical output unit 110 may be controlled by the control unit 140.

Specifically, the lens assembly 310 may include a lens 312, a lens barrel 314, a lens holder 316, and an IR filter 318.

The lens 312 may be provided as a plurality of lenses or may be provided as one lens. When the lens 312 is provided as the plurality of lenses, respective lenses may be arranged with respect to a central axis thereof to form an optical system. Here, the central axis may be the same as an optical axis of the optical system. The lens 312 may include the above-described variable lens.

The lens barrel 314 may be coupled to the lens holder 316 and may have a space capable of accommodating the lens therein. Although the lens barrel 314 may be rotationally coupled to the one lens or the plurality of lenses, this is merely an example, and the lens barrel 314 may be coupled through other methods such as a method using an adhesive (for example, an adhesive resin such as an epoxy).

The lens holder 316 may be coupled to the lens barrel 314 to support the lens barrel 314 and may be disposed on the printed circuit board 330 on which the sensor 320 is mounted. A space in which the IR filter 318 may be disposed may be formed in the lens barrel 314 due to the lens holder 316. Although not shown, a driver capable of tilting or shifting the lens barrel 314 under control of the control unit 140 may be disposed in the lens barrel 314. A spiral pattern may be formed on an inner circumferential surface of the lens holder 316, and the lens holder 316 may be rotatably coupled to the lens barrel 314 in which a spiral pattern is similarly formed on an outer circumferential surface thereof. However, this is merely an example, and the lens holder 316 and the lens barrel 314 may be coupled through an adhesive, or the lens holder 316 and the lens barrel 314 may be integrally formed.

The lens holder 316 may be divided into an upper holder 316-1 coupled to the lens barrel 314 and a lower holder 316-2 disposed on the printed circuit board 330 on which the sensor 320 is mounted. The upper holder 316-1 and the lower holder 316-2 may be integrally formed, may be formed in separated structures and then connected or coupled, or may have structures that are separated and spaced apart from each other. In this case, a diameter of the upper holder 316-1 may be less than a diameter of the lower holder 316-2.

The above example is merely an exemplary embodiment, and the optical unit 120 may be formed in another structure capable of condensing a reflected optical signal incident to a ToF camera module 100 and transmitting the collected optical signal to the sensor 130.

FIG. 12 is a diagram for describing a sensor according to an exemplary embodiment, FIG. 13 is a diagram for describing a process of generating an electrical signal in a sensor according to an exemplary embodiment, and FIG. 14 is a timing diagram of one frame period for which a distance image is generated in a sensor according to an exemplary embodiment.

Referring to FIG. 12, as described above, a sensor 130 may include a plurality of pixels PX and have an array structure. In this case, the sensor 130 may be an active pixel sensor (APS) and may be a complementary metal oxide semiconductor (CMOS) sensor. In addition, the sensor 130 may be a charge coupled device (CCD) sensor. The sensor 130 may include a ToF sensor which receives an IR optical signal reflected by a subject to measure a distance using a time difference or a phase difference.

For example, in the sensor 130, the plurality of pixels may be disposed in parallel in a first direction and a second direction. The plurality of pixels may be in the form of a matrix. In addition, in an exemplary embodiment, the plurality of pixels may include first pixels P1 and second pixels P2. The first pixel P1 and the second pixel P2 may be alternately disposed in the first direction and the second direction. That is, with respect to one first pixel P1, the plurality of second pixels P2 may be disposed adjacent to each other in the first direction and the second direction. For example, in the sensor 130, the first pixel P1 and the second pixel P2 may be disposed in a checkerboard pattern. That is, as shown in FIG. 12, in the case of the sensor 130 having a resolution of 320×240, 76,800 pixels may be arranged in a grid form.

In addition, the first pixel P1 and the second pixel P2 may be pixels that receive light beams having peak wavelengths in different wavelength bands. For example, the first pixel P1 may receive light having a peak wavelength in an IR band. The second pixel P2 may receive light having a wavelength that is a wavelength out of an IR band. In addition, any one of the first pixel P1 and the second pixel P2 may not receive light.

In addition, the plurality of pixels PX may have various shapes such as a quadrangular shape, a triangular shape, a polygonal shape, and a circular shape. Furthermore, an effective area in the pixel PX may also have various shapes such as a quadrangular shape, a triangular shape, a polygonal shape, and a circular shape.

That is, the plurality of pixels PX may be disposed to be spaced apart from each other by a certain interval. Such a spacing interval may be very less than a size of the pixel PX, and a wire may be disposed in the spacing interval. Hereinafter, in the present specification, descriptions will be provided by ignoring the spacing interval.

The pixel PX may include a detection unit 131 (photogate), a switching unit (hereinafter, referred to as a first gate 132 and a second gate 133), and accumulation units 134 and 135. The detection unit 131 may include an N-type semiconductor layer, a P-type semiconductor layer, and an active layer disposed between the N-type semiconductor layer and the P-type semiconductor layer, and the active layer may generate a current from a reflected optical signal. In other words, the detection unit 131 may receive the reflected optical signal to generate electrons.

The first gate 132 and the second gate 133 may adjust electrons generated by the detection unit 131 to transfer to the accumulation units 134 and 135, respectively. FIG. 12 illustrates that a plurality of gates, for example, the first gate 132 and the second gate 133 are provided, and electrons are selectively transferred to the accumulation units 134 and 135 according to a control signal for switching the gates. In addition, turn-on/off of the gate may be controlled according to a reference signal described in the specification. The accumulation units 134 and 135 may accumulate the transferred electrons. An electron accumulation time or period may be controlled by a signal applied to the switching unit. The accumulation units 134 and 135 may accumulate electrons for a certain time, output an amount of the accumulated electrons, and then discharge the accumulated electrons.

In other words, the sensor 130 may include charging elements and switching elements. Here, the charging elements may be the accumulation units 134 and 135, and the switching elements may be the first and second gates 132 and 133. In addition, in this case, the charging elements may include a capacitor and the like, and the switching elements may include various switching elements such as a field effect transistor, but the present invention is not limited to the above-described types.

Through the above-described operation, each pixel PX may generate an electrical signal. In addition, the pixel PX may include a plurality of photodiodes and a plurality of transistors.

Referring to FIG. 13, a phase of reflected light (input light) RS may be delayed according to a distance by which input light (irradiated light) GS is reflected to return after being incident on an object.

In this case, a control unit according to an exemplary embodiment may provide a reference signal to the gate of the pixel in order to derive a phase difference between the irradiated light GS and a reflected optical signal RS. In this case, there may be a plurality of reference signals. In an exemplary embodiment, as shown in FIG. 13, there may be four reference signals C1 to C4. The reference signals C1 to C4 may each have the same frequency as an optical signal or a reflected optical signal and may have a phase difference of 90°. Among the four reference signals, one signal (for example, C1) may have the same phase as the optical signal. The reference signals C1 to C4 may be applied to the sensor, and the sensor may generate an electrical signal from reflected light LS2 according to the reference signal. In other words, in the sensor, an effective area of the sensor may be exposed in response to each reference signal, and the sensor may receive a reflected optical signal during a time (exposure time) for which the effective area is exposed. When the reference signal is in an on state (positive state), the sensor may be charged with electric charges from the reflected light LS2 to generate an electrical signal. Accordingly, the sensor may generate an electrical signal corresponding to a shaded portion of FIG. 13.

In another exemplary embodiment, optical signals may be generated at a plurality of frequencies during an exposure time. In this case, the sensor absorbs input reflected optical signals according to the plurality of frequencies. For example, it is assumed that optical signals are generated at frequencies f1 and f2 and a plurality of reference signals have a phase difference of 90°. In this case, since reflected optical signals also have the frequencies f1 and f2, four electrical signals may be generated through the optical signal having the frequency f1 and four reference signals corresponding thereto. Four electrical signals may be generated through the reflected optical signal having the frequency f2 and four reference signals corresponding thereto. Accordingly, a total of eight electrical signals may be generated. Hereinafter, a case in which an optical signal is generated with one frequency will be described, but as described above, optical signals may be generated with a plurality of frequencies.

In addition, an integration time refers to a predetermined period in which a gate is turned on/off in response to a reference signal. For example, the integration time may be variously changed according to a driving method of the sensor. When a plurality of light-receiving units (for example, a plurality of photodiodes) are present in the pixel of the sensor, distance information about the pixel may be acquired in one integration time. That is, one integration time may correspond to one frame period. However, the present invention is not limited thereto, and the sensor may be driven in a multi-phase type such as a one-phase type or a two-phase type, and a plurality of integration times may constitute one frame period.

Referring to FIG. 14, four integration times P1 to P4 may form one frame period (one frame cycle). The four integration times may include a first integration time P1, a second integration time P2, a third integration time P3, and a fourth integration time P4.

A first reference signal C1 may be provided to the pixel PX during the first integration time P1. During the second integration time P2, the pixel PX may be turned on, and thereafter, a second reference signal C2 may be provided. A third reference signal C3 may be provided to the pixel during the third integration time P3. A fourth reference signal C4 may be provided to the pixel PX during the fourth integration time P4.

The first to fourth integration times P1 to P4 may constitute one frame period, and a read-out may be present between the integration times. For example, the read-out may be present between the first integration time P1 and the second integration time P2. In this case, the read-out is a section in which an amount of electric charge charged in the pixel is discharged. One frame period may be a time period including all of the first to fourth integration times P1 to P4 and the read-outs sequentially positioned between the integration times.

In addition, since the first to fourth reference signals C1 to C4 are signals for controlling the charging of the charging element in the pixel and are gate signals in the switching element, each of the plurality of pixels may output each of electrical signals corresponding to the reference signals. Accordingly, electric charges stored in the pixel can be easily discharged through each read-out, thereby accurately calculating an amount of electric charge charged in each integration time.

In addition, more specifically, a phase difference between an optical signal and a reflected optical signal may be calculated using the reference signal. As described above, four electrical signals may be generated with respect to an optical signal for each one frame period. Accordingly, a control unit 140 may calculate a phase difference $t_d$ between an optical signal and a reflected optical signal using Equation 1 below.

$$t_d = \arctan\left(\frac{Q_3 - Q_4}{Q_1 - Q_2}\right) \quad \text{[Equation 1]}$$

Here, $Q_1$ to $Q_4$ each denote an amount of charged electric charge of one of four electrical signals (hereinafter, referred to an amount of electric charge, wherein the amount of electric charge is provided to the control unit and distance information or distance information is calculated as will be described below). $Q_1$ denotes an amount of electric charge of an electrical signal corresponding to a reference signal having the same phase as the optical signal. $Q_2$ denotes an amount of electric charge of an electrical signal corresponding to a reference signal having a phase delayed from that of the optical signal by 180°. $Q_3$ denotes an amount of electric charge of an electrical signal corresponding to a reference signal having a phase delayed from that of the optical signal by 90°. $Q_4$ denotes an amount of electric charge of an electrical signal corresponding to a reference signal having a phase delayed from that of the optical signal by 270°.

However, integration times required to calculate the phase difference $t_d$ between the optical signal and the reflected optical signal in one frame period may be variously changed according to the number of the charging elements, the number of the switching elements, and the number of the light-receiving units in the sensor 130 as described above.

In addition, a plurality of integration times may be present in one frame period, and four reference signals having a phase difference of 90° may be provided to the pixel for each integration time. The control unit may calculate the described-above phase difference to between the optical signal and the reflected light signal using an amount of electric charge of an electrical signal generated during each integration time.

In addition, the control unit 140 may calculate a distance between an object and a camera module 100 using the phase difference to between the optical signal and the reflected optical signal. In this case, the control unit 140 may calculate a distance d (see Equation 2) between the object and the camera module 100 using Equation 2 below.

$$d = \frac{c}{2f} \frac{t_d}{2\pi} \quad \text{[Equation 2]}$$

Here, c denotes the speed of light, and f denotes a frequency of output light.

According to an exemplary embodiment, a ToF IR image and a distance (depth) image may be acquired from the camera module 100. Accordingly, the camera module according to the exemplary embodiment of the present invention may be referred to as a ToF camera module or a ToF camera device. Thus, in the camera module according to the exemplary embodiment, the control unit may extract distance information that indicates a distance between the object and the camera module.

In the present exemplary embodiment, one frame period may be repeated twice. That is, in an exemplary embodiment, since distance measurement for a second optical signal GS2 is performed after distance measurement for a first optical signal GS1 is performed, the first to fourth integration times P1 to P4 may be repeated.

More specifically, as shown in FIG. 18, the camera module 100 according to the exemplary embodiment may generate raw images for four phases. Here, the four phases may be 0°, 90°, 180°, and 270°, and the raw image for each phase may be an image having a pixel value digitized for each phase or an analog pixel value and may be used interchangeably with a phase image, a phase IR image, and the like. In this case, the raw images for the four phases may be acquired by an electrical signal generated from a second sensing area, and images shown in FIGS. 18 to 20 may be images acquired for phases when an entire area of the sensor is an extraction area or may be amplitude images or distance images that may be acquired from the images.

FIG. 15 is a diagram for describing the driving of a sensor according to an exemplary embodiment.

Referring to FIG. 15, there may be four integration times and four read-outs during one frame period for which the sensor may extract a distance image.

One frame period may include a first integration time P1, a second integration time P2, a third integration time P3, and a fourth integration time P4. Read-out may be performed between respective integration times.

In addition, for each integration time, each pixel may generate electrical signals for different phases. That is, different reference signals may be applied. Specifically, a first reference signal (corresponding to the above-described C1) having the same period as a first optical signal GS1 may be applied to a pixel PX in the first integration time P1. In this case, it is assumed that the first optical signal GS1 and a second optical signal GS2 have the same period. Accordingly, after the first to fourth integration times may proceed for the first optical signal GS1, the first to fourth integration times may proceed again for the second optical signal GS2.

However, as described above, when the period of the first optical signal GS1 is shorter than the period of the second optical signal GS2, periods of reference signals C1 to C4 applied with respect to a first reflected optical signal may be shorter than periods of reference signals C1' to C4' applied with respect to a second reflected optical signal.

In addition, in the second integration time P2, a second reference signal (corresponding to the above-described C2), which has a phase delayed from a phase of the first reference signal by 180°, may be applied to the pixel PX. In the third integration time P3, a third reference signal (corresponding to the above-described C3), which has a phase delayed from a phase of the first reference signal C1 by 90°, may be applied to the pixel PX. In addition, in the fourth integration time P4, a fourth reference signal (corresponding to the above-described C4), which has a phase delayed from a phase of the first reference signal by 270°, may be applied.

First to fourth reference signals C1' to C4' with respect to the second optical signal GS2 may be applied to the pixel during the first to fourth integration times P1 to P4, respectively.

Accordingly, in the first integration time P1, the pixel PX may generate an amount of first-first electric charge Q1, which is an amount of electric charge corresponding to the first optical signal GS1, according to the first reference signal C1. In the second integration time P2, the pixel PX may generate an amount of first-second electric charge Q2, which is an amount of electric charge corresponding to the first optical signal GS1, according to the second reference signal C2. In the third integration time P3, the pixel PX may generate an amount of first-third electric charge Q3, which is an amount of electric charge corresponding to the first optical signal GS1, according to the third reference signal C3. In the fourth integration time P4, the pixel PX may generate an amount of first-fourth electric charge Q4, which is an amount of electric charge corresponding to the first optical signal GS1, according to the fourth reference signal C4.

In addition, after one frame period, the first to fourth integration times P1 to P4 may be sequentially proceed for the second optical signal. Accordingly, in the first integration time P1, the pixel PX may generate an amount of second-first electric charge Q1', which is an amount of electric charge corresponding to the second optical signal GS2, according to the first reference signal C1'. In the second integration time P2, the pixel PX may generate an amount of second-second electric charge Q2', which is an amount of electric charge corresponding to the second optical signal GS2, according to the second reference signal C2'. In the third integration time P3, the pixel PX may generate an amount of second-third electric charge Q3', which is an amount of electric charge corresponding to the second optical signal GS2, according to the third reference signal C3'. In the fourth integration time P4, the pixel PX may generate an amount of second-fourth electric charge Q4', which is an amount of electric charge corresponding to the second optical signal GS2, according to the fourth reference signal C4'.

FIG. 16 is a diagram for describing the driving of a sensor according to another exemplary embodiment.

Referring to FIG. 16, one frame period may include two integration times (two integration times include a previous first integration time and a subsequent second integration time, which will be mainly described in the present diagrams). A sensor 130 may provide each of a first reference signal C1 and a second reference signal C2 to a pixel PX during the first integration time. During the second integration time, the sensor 130 may provide each of a third reference signal C3 and a fourth reference signal C4 to the pixel PX. Accordingly, Q1 and Q2 may be generated in the first integration time, and Q3 and Q4 may be generated in the second integration time. Accordingly, a control unit may generate all Q1 to Q4 in previous one frame period and may calculate a phase difference between a first optical signal GS1 and a first reflected optical signal RS1 using amounts of electric charge of generated four electrical signals. Accordingly, the control unit according to the exemplary embodiment may output distance information.

In subsequent one frame period, the sensor 130 may provide each of a first reference signal C1' and a second reference signal C2' to the pixel PX during the first integration time. During the second integration time, the sensor 130 may provide each of a third reference signal C3' and a fourth reference signal C4' to the pixel PX. Accordingly, Q1' and Q2' may be generated in the first integration time, and Q3' and Q4' may be generated in the second integration time. Accordingly, the control unit may generate all Q1' to Q4' in subsequent one frame period and may calculate a phase difference between a second optical signal GS2 and a second reflected optical signal RS2 using amounts of electric charge of generated four electrical signals. Accordingly, the control unit according to the exemplary embodiment may output distance information.

In addition, as described above, when a period of the first optical signal GS1 is shorter than a period of a second optical signal GS2, periods of the reference signals C1 to C4 applied with respect to the first reflected optical signal may be shorter than periods of the reference signals C1' to C4' applied with respect to the second reflected optical signal.

FIG. 17 is a diagram for describing the driving of a sensor according to still another exemplary embodiment.

One frame period may include one integration time. A sensor 130 may provide each of first to fourth reference signals C1 to C4 to a pixel PX during the integration time. Accordingly, Q1, Q2, Q3, and Q4 may be generated in the integration time. Accordingly, a control unit may generate all Q1 to Q4 in a previous one frame period and may calculate a phase difference between a first optical signal GS1 and a first reflected optical signal RS1 using amounts of electric charge of generated four electrical signals. Accordingly, the control unit according to the exemplary embodiment may output distance information.

In subsequent one frame period, the sensor 130 may provide each of first to fourth reference signals C1' to C4' to the pixel PX during the integration time.

Accordingly, Q1', Q2', Q3', and Q4' may be generated in the integration time. Accordingly, the control unit may generate all Q1' to Q4' in subsequent one frame period and may calculate a phase difference between a second optical signal GS2 and a second reflected optical signal RS2 using amounts of electric charge of generated four electrical signals. Accordingly, the control unit according to the exemplary embodiment may output distance information.

In addition, the control unit may process an average of electrical signals acquired through a plurality of sub-integration times into an electrical signal of one integration time. Accordingly, it is possible to further improve the accuracy of an electrical signal with respect to a distance.

In addition, as described above, when a period of the first optical signal GS1 is shorter than a period of the second optical signal GS2, periods of the reference signals C1 to C4 applied with respect to the first reflected optical signal may be shorter than periods of the reference signals C1' to C4' applied with respect to the second reflected optical signal.

FIG. 18 shows raw images for four phases acquired from a camera module according to an exemplary embodiment, FIG. 19 is an amplitude image acquired from a camera module according to an exemplary embodiment, and FIG. 20 shows distance images acquired from a camera module according to an exemplary embodiment.

Referring to FIGS. 18 and 19, when calculation is performed as in Equation 3 using four phase images Raw($x_0$), Raw($x_{90}$), Raw($x_{180}$), and Raw($x_{270}$) (see FIG. 18), it is possible to acquire an amplitude image (see FIG. 19) which is a ToF IR image.

$$\text{Amplitude} = \frac{1}{2}\sqrt{(Raw(x_{90}) - Raw(x_{270}))^2 + (Raw(x_{180}) - Raw(x_0))^2}$$

[Equation 3]

Here, Raw($x_0$) may denote a data value for each pixel received in a phase of 0° by a sensor, Raw($x_{90}$) may denote a data value for each pixel received in a phase of 90° by the sensor, Raw($x_{180}$) may denote a data value for each pixel received in a phase of 180° by the sensor, and Raw($x_{270}$) may denote a data value for each pixel received in a phase of 270° by the sensor. Here, the phase represents a phase delayed from that of a first reference signal.

Alternatively, when calculation is performed as in Equation 4 using the four phase images of FIG. 18, it is possible to acquire an intensity image which is another ToF IR image.

Intensity=|Raw ($x_{90}$)−Raw ($x_{270}$)|+|Raw($x_{180}$)−Raw ($x_0$)|  [Equation 4]

Here, Raw($x_0$) may denote a data value for each pixel received in a phase of 0° by the sensor, Raw($x_{90}$) may denote a data value for each pixel received in a phase of 90° by the sensor, Raw($x_{180}$) may denote a data value for each pixel received in a phase of 180° by the sensor, and Raw($x_{270}$) may denote a data value for each pixel received in a phase of 270° by the sensor.

As described above, the ToF IR image may be generated through a process of respectively extracting two phase images from other two phase images among the four phase images. For example, two phase images of which one phase image is extracted from another image may have a phase difference of 180°. In the process of respectively extracting two phase images from other two phase, background light may be removed. Accordingly, only a signal in a wavelength band output by a light source remains in the ToF IR image, thereby increasing IR sensitivity with respect to an object and significantly reducing noise.

In the present specification, the ToF IR image may refer to the amplitude image or the intensity image, and the intensity image may be used interchangeably with a confidence image. As shown in FIG. 19, the ToF IR image may be a gray image.

Meanwhile, when calculation is performed as in Equations 5 and 6 using the four phase images of FIG. 18, it is also possible to acquire distance images of FIG. 20. Equations 5 and 6 may correspond to Equations 1 and 2 described above, respectively.

$$\text{Phase} = \arctan\left(\frac{Raw(x_{90}) - Raw(x_{270})}{Raw(x_{180}) - Raw(x_0)}\right)$$ [Equation 5]

$$\text{Depth} = \frac{1}{2f}c\frac{\text{Phase}}{2\pi} \quad (c = \text{speed of light})$$ [Equation 6]

FIG. 21 is a flowchart for describing a method of driving a camera module according to an exemplary embodiment, and FIG. 22 is a flowchart for describing a method of driving a camera module according to another exemplary embodiment.

Referring to FIGS. 21 and 22, the camera module according to the exemplary embodiment may output a first optical signal (S1000). The camera module may calculate a phase difference through a first reflected optical signal which is the first optical signal returned by being reflected by an object. As described above, a control unit may derive a distance between the object and the camera module or information about the distance (first distance information) through the phase difference (S1100). In this case, when the object is positioned within a preset distance, the camera module may recalculate a distance to the object by re-irradiating the first optical signal. For example, the camera module may determine whether the object is positioned within the preset distance according to the measurement of a distance to the object. For example, when an electrical signal reaches a predetermined threshold or more or reaches saturation, the camera module may determine that the object is positioned within the preset distance. However, when the distance between the object and the camera module is longer than the preset distance, a second optical signal may be output (S1200). In this case, as described above, the second optical signal may have irradiance that is different from that of the first optical signal.

In an exemplary embodiment, the amount of irradiance of the second optical signal may be greater than that of the first output signal. In other words, the first optical signal may be output when the distance between the object and the camera module is short. Due to such a configuration, the camera module according to the exemplary embodiment can accurately measure a distance to the object, and when the object is a human, it is possible to secure the safety of the human body. However, the above-described contents may be identically applied to various exemplary embodiments related to a relationship between the first optical signal and the second optical signal.

After the second optical signal is output (S2000), it may be checked whether a preset time has elapsed (S2100). That is, when the preset time has elapsed after the second optical signal is output, the control unit may output the first optical signal again (S2200). This is to secure the safety of the object in preparation for a case in which the object moves again.

It is checked again whether the object is positioned within the preset distance (S2300), and when the object is present within a preset position, the first optical signal may be output. When the object is positioned at a distance longer than the preset distance, the second optical signal may be output (S2400) to acquire second distance information, and thus, a distance between the object and the camera module may be measured again.

The present invention has been described based on the exemplary embodiments, but the exemplary embodiments are for illustrative and do not limit the present invention, and those skilled in the art will appreciate that various modifications and applications, which are not exemplified in the above description, may be made without departing from the scope of the essential characteristic of the present exemplary embodiments. For example, each component described in detail in the exemplary embodiment can be modified. Further, the differences related to the modification and the application should be construed as being included in the scope of the present invention defined in the appended claims.

The invention claimed is:

1. A camera module comprising:
    an optical output unit configured to output a first optical signal and a second optical signal to an object;
    a sensor configured to receive a first reflected optical signal which is the first optical signal reflected by the object; and
    a control unit configured to acquire first distance information for the object using a phase difference between the first optical signal and the first reflected optical signal,
    wherein an output power of the first optical signal is less than an output power of the second optical signal,
    wherein the control unit determines whether to output the second optical signal using the first distance information, and
    wherein a period of the first optical signal is shorter than a period of the second optical signal.

2. The camera module of claim 1, wherein, when the distance information is less than a preset value, the control unit controls the first optical signal to output, and
    wherein, when the distance information is greater than the preset value, the control unit controls the second optical signal to output.

3. The camera module of claim 1, wherein the optical output unit includes a first channel unit and a second channel unit, and
    wherein the second channel unit includes a greater number of light sources than the first channel unit.

4. The camera module of claim 3, wherein the first optical signal is output from the first channel unit, and
    wherein the second optical signal is output from the second channel unit.

5. The camera module of claim 1, wherein the optical output unit includes a plurality of light sources, and
    wherein an output power of the plurality of light sources when the second optical signal is output is greater than that when the first optical signal is output.

6. The camera module of claim 1, wherein the optical output unit outputs a frame signal, which is a minimum unit for calculating the first distance information, in a preset period.

7. The camera module of claim 1, wherein the control unit acquires second distance information for the object using the second optical signal.

8. The camera module of claim 7, wherein the optical output unit alternately outputs a frame signal of the first optical signal and a frame signal of the second optical signal.

9. The camera module of claim 1, wherein, when the first reflected optical signal received by the sensor is received in an amount that is less than or equal to a first reception light amount, the second optical signal is output.

10. The camera module of claim 9, wherein, when the first reflected optical signal is received in an amount that is less than or equal to a second reception amount less than the first reception light amount or when the first reflected optical signal is not received, the output of the first optical signal is turned off.

11. A camera module comprising:
    an optical output unit configured to output a first optical signal and a second optical signal to an object;
    a sensor configured to receive a first reflected optical signal which is the first optical signal reflected by the object; and
    a control unit configured to output the second optical signal when distance information acquired using a phase difference between the first optical signal and the first reflected optical signal is greater than a preset value and configured to output the first optical signal when the distance information is less than the preset value,
    wherein three-dimensional (3D) information of the object is acquired using the second optical signal, and
    wherein a period of the first optical signal is shorter than a period of the second optical signal.

12. The camera module of claim 11, wherein the preset value may be a value corresponding to 10 cm.

13. The camera module of claim 11, wherein, when the distance information is less than a preset value, the control unit controls the first optical signal to output, and
    wherein, when the distance information is greater than the preset value, the control unit controls the second optical signal to output.

14. The camera module of claim 11, wherein the optical output unit includes a first channel unit and a second channel unit, and
    wherein the second channel unit includes a greater number of light sources than the first channel unit.

15. The camera module of claim 14, wherein the first optical signal is output from the first channel unit, and
    wherein the second optical signal is output from the second channel unit.

16. The camera module of claim 11, wherein the optical output unit includes a plurality of light sources, and
    wherein an output power of the plurality of light sources when the second optical signal is output is greater than that when the first optical signal is output.

17. The camera module of claim 11, wherein the optical output unit outputs a frame signal, which is a minimum unit for calculating the first distance information, in a preset period.

18. The camera module of claim 11, wherein the control unit acquires second distance information for the object using the second optical signal.

* * * * *